(12) United States Patent
Fukumitsu et al.

(10) Patent No.: US 8,969,752 B2
(45) Date of Patent: *Mar. 3, 2015

(54) LASER PROCESSING METHOD

(75) Inventors: Kenshi Fukumitsu, Hamamatsu (JP);
Fumitsugu Fukuyo, Hamamatsu (JP);
Naoki Uchiyama, Hamamatsu (JP)

(73) Assignee: Hamamatsu Photonics K.K.,
Hamamatsu-shi, Shizuoka (JP)

( * ) Notice: Subject to any disclaimer, the term of this patent is extended or adjusted under 35 U.S.C. 154(b) by 1289 days.

This patent is subject to a terminal disclaimer.

(21) Appl. No.: 10/548,522

(22) PCT Filed: Sep. 11, 2003

(86) PCT No.: PCT/JP03/11626
§ 371 (c)(1),
(2), (4) Date: Nov. 9, 2006

(87) PCT Pub. No.: WO2004/082006
PCT Pub. Date: Sep. 23, 2004

(65) Prior Publication Data
US 2007/0158314 A1    Jul. 12, 2007

(30) Foreign Application Priority Data

Mar. 12, 2003  (JP) ................. P2003-067276

(51) Int. Cl.
*B23K 15/00*     (2006.01)
*B23K 26/00*     (2014.01)
(Continued)

(52) U.S. Cl.
CPC .............. *B28D 5/0011* (2013.01); *B28D 1/221* (2013.01); *B28D 5/0052* (2013.01);
(Continued)

(58) Field of Classification Search
CPC .. B23K 26/0057; B23K 26/03; B23K 26/032; B23K 26/034; B23K 26/046; B23K 26/0635; B23K 26/0656; B23K 26/073; B23K 26/0853; B23K 26/367; B23K 26/40
USPC ............. 219/121.67, 121.68, 121.69, 121.7, 219/121.71, 121.76, 121.6, 121.61, 121.62, 219/121.63, 121.64, 121.65, 121.66, 219/121.75, 121.78, 121.79, 121.85, 219/121.22, 124.21, 124.22, 124.31–136, 219/137 R, 137.2–162, 121.72; 408/701; 264/1.36–1.37, 400, 408, 409, 410, 264/497, 482; 29/888.043, 806; 257/E23.148, E23.15, E21.028, 257/E21.17, E21.347, E21.348, E21.345, 257/E21.475, E21.517, E21.592, E21.596; 372/1, 2, 3, 5, 6, 7, 8, 38.02, 38.07, 372/50.12, 71; 148/97, 224, 525, 565, 903, 148/DIG. 90, DIG. 91, DIG. 92, DIG. 93, 148/DIG. 94, DIG. 95, DIG. 153; 356/318, 356/459, 470, 956, FOR. 112
See application file for complete search history.

(56) References Cited

U.S. PATENT DOCUMENTS 3,448,510 A    6/1969  Bippus et al.
(Continued)

FOREIGN PATENT DOCUMENTS

CN    1160228 A    9/1997
(Continued)

OTHER PUBLICATIONS

A. Ishii et al., "$CO_2$ Laser Processing Technology," Nikkan Kogyo Publishing Production, Dec. 21, 1992, pp. 63-65 (with partial English translation).
(Continued)

*Primary Examiner* — Dana Ross
*Assistant Examiner* — Gyounghyun Bae
(74) *Attorney, Agent, or Firm* — Drinker Biddle & Reath LLP

(57) ABSTRACT

The present invention provides a laser processing method comprising the steps of attaching a protective tape 25 to a front face 3 of a wafer 1a, irradiating a substrate 15 with laser light L while employing a rear face of the wafer 1a as a laser light entrance surface and locating a light-converging point P within the substrate 15 so as to form a molten processed region 13 due to multiphoton absorption, causing the molten processed region 13 to form a cutting start region 8 inside by a predetermined distance from the laser light entrance surface along a line 5 along which the object is intended to be cut in the wafer 1a, attaching an expandable tape 23 to the rear face 21 of the wafer 1a, and expanding the expandable tape 23 so as to separate a plurality of chip parts 24 produced upon cutting the wafer 1a from the cutting start region 8 acting as a start point from each other.

42 Claims, 24 Drawing Sheets

(51) Int. Cl.
  *B23K 26/04* (2014.01)
  *B23K 26/14* (2014.01)
  *B23K 26/06* (2014.01)
  *B23K 26/02* (2014.01)
  *B23K 9/12* (2006.01)
  *G01B 15/00* (2006.01)
  *H05B 6/00* (2006.01)
  *B23P 19/00* (2006.01)
  *C22F 3/00* (2006.01)
  *C23C 8/00* (2006.01)
  *B28D 5/00* (2006.01)
  *B28D 1/22* (2006.01)
  *B23K 26/40* (2014.01)

(52) U.S. Cl.
  CPC ......... *B23K 26/0057* (2013.01); *B23K 26/4075* (2013.01); *B23K 2201/40* (2013.01); *Y10S 148/903* (2013.01)
  USPC ............. 219/121.16; 219/121.6; 219/121.61; 219/121.62; 219/121.63; 219/121.64; 219/121.65; 219/121.66; 219/121.67; 219/121.69; 219/121.71; 219/121.72; 219/121.75; 219/121.76; 219/121.78; 219/121.79; 219/121.85; 219/121.22; 219/124.21; 219/124.22; 264/1.36; 264/1.37; 264/400; 264/408; 264/409; 264/410; 264/498; 264/482; 29/888.043; 29/806; 257/E23.148; 257/E23.15; 257/E21.028; 257/E21.17; 257/E21.347; 148/97; 148/224; 148/525; 148/565; 148/903; 372/1; 372/2; 372/3; 372/4; 372/5; 356/318; 356/459; 356/470; 356/956

(56) References Cited

U.S. PATENT DOCUMENTS

| | | | |
|---|---|---|---|
| 3,543,979 A | 12/1970 | Grove et al. | |
| 3,610,871 A | 10/1971 | Lumley | |
| 3,613,974 A | 10/1971 | Chatelain et al. | |
| 3,626,141 A | 12/1971 | Daly | |
| 3,629,545 A * | 12/1971 | Graham et al. | 219/121.72 |
| 3,790,051 A | 2/1974 | Moore | |
| 3,790,744 A * | 2/1974 | Bowen | 219/121.69 |
| 3,800,991 A | 4/1974 | Grove et al. | |
| 3,824,678 A | 7/1974 | Harris et al. | |
| 3,909,582 A | 9/1975 | Bowen | |
| 3,932,726 A | 1/1976 | Verheyen et al. | |
| 3,970,819 A * | 7/1976 | Gates et al. | 219/121.69 |
| 3,991,296 A * | 11/1976 | Kojima et al. | 219/121.68 |
| 4,027,137 A | 5/1977 | Liedtke | |
| 4,046,985 A * | 9/1977 | Gates | 219/121.82 |
| 4,092,518 A | 5/1978 | Merard | |
| 4,190,759 A * | 2/1980 | Hongo et al. | 219/121.68 |
| 4,224,101 A * | 9/1980 | Tijburg et al. | 438/463 |
| 4,242,152 A | 12/1980 | Stone | |
| 4,306,351 A | 12/1981 | Ohsaka et al. | |
| 4,336,439 A | 6/1982 | Sasnett et al. | |
| 4,403,134 A | 9/1983 | Klingel | |
| 4,475,027 A | 10/1984 | Pressley | |
| 4,531,060 A | 7/1985 | Suwa et al. | |
| 4,543,464 A * | 9/1985 | Takeuchi | 219/121.68 |
| 4,546,231 A | 10/1985 | Gresser et al. | |
| 4,562,333 A | 12/1985 | Taub et al. | 219/121 |
| 4,650,619 A | 3/1987 | Watanabe | |
| 4,682,003 A | 7/1987 | Minakawa et al. | |
| 4,689,467 A | 8/1987 | Inoue | |
| 4,691,093 A | 9/1987 | Banas et al. | |
| 4,734,550 A | 3/1988 | Imamura et al. | |
| 4,769,310 A | 9/1988 | Gugger et al. | |
| 4,814,575 A | 3/1989 | Petitbon | |
| 4,815,854 A | 3/1989 | Tanaka et al. | |
| 4,899,126 A | 2/1990 | Yamada | |
| 4,914,815 A | 4/1990 | Takada et al. | |
| 4,942,284 A | 7/1990 | Etcheparre et al. | |
| 4,981,525 A | 1/1991 | Kiyama et al. | |
| 5,023,877 A * | 6/1991 | Eden et al. | 372/7 |
| 5,096,449 A | 3/1992 | Matsuzaki | |
| 5,132,505 A | 7/1992 | Zonneveld et al. | |
| 5,151,135 A * | 9/1992 | Magee et al. | 134/1 |
| 5,211,805 A | 5/1993 | Srinivasan | 156/543 |
| 5,230,184 A | 7/1993 | Bukhman | |
| 5,251,003 A | 10/1993 | Vigouroux et al. | |
| 5,254,149 A | 10/1993 | Hashemi et al. | |
| 5,254,833 A | 10/1993 | Okiyama | 219/121.68 |
| 5,293,389 A | 3/1994 | Yano et al. | |
| 5,298,719 A | 3/1994 | Shafir | |
| 5,300,942 A | 4/1994 | Dolgoff | |
| 5,304,357 A | 4/1994 | Sato et al. | |
| 5,321,717 A | 6/1994 | Adachi et al. | |
| 5,359,176 A | 10/1994 | Balliet, Jr. et al. | |
| 5,376,793 A | 12/1994 | Lesniak | |
| 5,382,770 A | 1/1995 | Black et al. | |
| 5,504,772 A | 4/1996 | Deacon et al. | |
| 5,508,489 A | 4/1996 | Benda et al. | |
| 5,521,999 A | 5/1996 | Chuang et al. | |
| 5,534,102 A | 7/1996 | Kadono et al. | |
| 5,543,365 A | 8/1996 | Wills et al. | 437/226 |
| 5,575,936 A | 11/1996 | Goldfarb | |
| 5,580,473 A | 12/1996 | Shinohara et al. | |
| 5,609,284 A | 3/1997 | Kondratenko | |
| 5,622,540 A | 4/1997 | Stevens | 65/112 |
| 5,637,244 A | 6/1997 | Erokhin | 219/121.69 |
| 5,641,416 A * | 6/1997 | Chadha | 219/121.69 |
| 5,656,186 A | 8/1997 | Mourou et al. | 219/121.69 |
| 5,663,980 A | 9/1997 | Adachi | |
| 5,747,769 A * | 5/1998 | Rockstroh et al. | 219/121.71 |
| 5,762,744 A * | 6/1998 | Shibata et al. | 156/235 |
| 5,767,483 A | 6/1998 | Cameron et al. | |
| 5,776,220 A | 7/1998 | Allaire et al. | 65/112 |
| 5,786,560 A | 7/1998 | Tatah et al. | |
| 5,795,795 A | 8/1998 | Kousai et al. | |
| 5,814,532 A | 9/1998 | Ichihara | |
| 5,826,772 A | 10/1998 | Ariglio et al. | 225/2 |
| 5,841,543 A | 11/1998 | Guldi et al. | |
| 5,867,324 A | 2/1999 | Kmetec et al. | |
| 5,882,956 A | 3/1999 | Umehara et al. | |
| 5,886,319 A | 3/1999 | Preston et al. | |
| 5,900,582 A | 5/1999 | Tomita et al. | |
| 5,916,460 A * | 6/1999 | Imoto et al. | 219/121.67 |
| 5,922,224 A * | 7/1999 | Broekroelofs | 219/121.72 |
| 5,925,024 A | 7/1999 | Joffe | |
| 5,925,271 A | 7/1999 | Pollack et al. | |
| 5,968,382 A | 10/1999 | Matsumoto et al. | |
| 5,976,392 A | 11/1999 | Chen | |
| 5,998,238 A * | 12/1999 | Kosaki | 438/114 |
| 6,023,039 A | 2/2000 | Sawada | |
| 6,031,201 A | 2/2000 | Amako et al. | |
| 6,055,829 A | 5/2000 | Witzmann et al. | 65/105 |
| 6,057,525 A | 5/2000 | Chang et al. | |
| 6,121,118 A | 9/2000 | Jin et al. | |
| 6,127,005 A | 10/2000 | Lehman et al. | |
| 6,141,096 A * | 10/2000 | Stern et al. | 356/318 |
| 6,156,030 A | 12/2000 | Neev | |
| 6,172,329 B1 | 1/2001 | Shoemaker et al. | |
| 6,175,096 B1 | 1/2001 | Nielsen | |
| 6,181,728 B1 | 1/2001 | Cordingley et al. | |
| 6,187,088 B1 | 2/2001 | Okumura | |
| 6,211,488 B1 | 4/2001 | Hoekstra et al. | 219/121.72 |
| 6,229,113 B1 | 5/2001 | Brown | |
| 6,229,114 B1 | 5/2001 | Andrews et al. | |
| 6,236,446 B1 | 5/2001 | Izumi et al. | |
| 6,252,197 B1 | 6/2001 | Hoekstra et al. | 219/121.84 |
| 6,257,224 B1 | 7/2001 | Yoshino et al. | 125/13.01 |
| 6,259,058 B1 | 7/2001 | Hoekstra | 219/121.75 |
| 6,285,002 B1 | 9/2001 | Ngoi et al. | |
| 6,294,439 B1 * | 9/2001 | Sasaki et al. | 438/464 |
| 6,322,958 B1 | 11/2001 | Hayashi | 430/495 |
| 6,325,855 B1 | 12/2001 | Sillmon et al. | |
| 6,327,090 B1 | 12/2001 | Rando et al. | |
| 6,333,486 B1 | 12/2001 | Troitski | |
| 6,344,402 B1 | 2/2002 | Sekiya | |

(56) References Cited

U.S. PATENT DOCUMENTS

| | | | |
|---|---|---|---|
| 6,359,254 B1 | 3/2002 | Brown | |
| 6,376,797 B1 | 4/2002 | Piwczyk et al. | |
| 6,402,004 B1 | 6/2002 | Yoshikuni et al. | |
| 6,407,363 B2 | 6/2002 | Dunsky et al. | |
| RE37,809 E | 7/2002 | Deacon et al. | |
| 6,413,839 B1* | 7/2002 | Brown et al. | 438/463 |
| 6,420,678 B1 | 7/2002 | Hoekstra | 219/121.75 |
| 6,438,996 B1 | 8/2002 | Cuvelier | |
| 6,489,588 B1 | 12/2002 | Hoekstra et al. | 219/121.76 |
| 6,527,965 B1* | 3/2003 | Gee et al. | 216/24 |
| 6,555,781 B2 | 4/2003 | Ngoi et al. | |
| 6,562,698 B2 | 5/2003 | Manor | |
| 6,566,683 B1 | 5/2003 | Ogawa et al. | |
| 6,653,210 B2 | 11/2003 | Choo et al. | |
| 6,726,631 B2 | 4/2004 | Hatangadi et al. | |
| 6,744,009 B1 | 6/2004 | Xuan et al. | |
| 6,770,544 B2 | 8/2004 | Sawada | |
| 6,787,732 B1 | 9/2004 | Xuan et al. | |
| 6,908,784 B1 | 6/2005 | Farnworth et al. | |
| 6,951,799 B2 | 10/2005 | Roche | |
| 6,992,026 B2 | 1/2006 | Fukuyo et al. | |
| 7,174,620 B2 | 2/2007 | Chiba et al. | |
| 7,396,742 B2 | 7/2008 | Fukuyo et al. | |
| 7,489,454 B2 | 2/2009 | Fukuyo et al. | |
| 7,547,613 B2 | 6/2009 | Fukuyo et al. | |
| 7,566,635 B2 | 7/2009 | Fujii et al. | |
| 7,592,237 B2 | 9/2009 | Sakamoto et al. | |
| 7,592,238 B2 | 9/2009 | Fukuyo et al. | |
| 7,605,344 B2 | 10/2009 | Fukumitsu | |
| 7,608,214 B2 | 10/2009 | Kuno et al. | |
| 7,615,721 B2 | 11/2009 | Fukuyo et al. | |
| 7,626,137 B2 | 12/2009 | Fukuyo et al. | |
| 7,709,767 B2 | 5/2010 | Sakamoto | |
| 7,718,510 B2 | 5/2010 | Sakamoto et al. | |
| 7,719,017 B2 | 5/2010 | Tanaka | |
| 7,732,730 B2 | 6/2010 | Fukuyo et al. | |
| 7,749,867 B2 | 7/2010 | Fukuyo et al. | |
| 7,754,583 B2 | 7/2010 | Sakamoto | |
| 7,825,350 B2 | 11/2010 | Fukuyo et al. | |
| 7,897,487 B2 | 3/2011 | Sugiura et al. | |
| 7,902,636 B2 | 3/2011 | Sugiura et al. | |
| 7,939,430 B2 | 5/2011 | Sakamoto et al. | |
| 7,947,574 B2 | 5/2011 | Sakamoto et al. | |
| 7,989,320 B2 | 8/2011 | Boyle et al. | |
| 2001/0019361 A1* | 9/2001 | Savoye | 348/222 |
| 2001/0029673 A1 | 10/2001 | Brown et al. | |
| 2001/0035401 A1 | 11/2001 | Manor | |
| 2001/0046112 A1 | 11/2001 | Herchen | |
| 2002/0005805 A1* | 1/2002 | Ogura et al. | 343/700 R |
| 2002/0006765 A1 | 1/2002 | Michel et al. | 451/28 |
| 2002/0023903 A1 | 2/2002 | Ngoi et al. | |
| 2002/0023907 A1* | 2/2002 | Morishige | 219/121.85 |
| 2002/0025432 A1 | 2/2002 | Noguchi et al. | |
| 2002/0050489 A1* | 5/2002 | Ikegami et al. | 219/121.69 |
| 2002/0096994 A1 | 7/2002 | Iwafuchi et al. | |
| 2002/0115235 A1 | 8/2002 | Sawada | |
| 2002/0125232 A1 | 9/2002 | Choo et al. | |
| 2002/0130367 A1* | 9/2002 | Cabral et al. | 257/368 |
| 2002/0158288 A1 | 10/2002 | Yamazaki et al. | |
| 2002/0170896 A1 | 11/2002 | Choo et al. | |
| 2002/0170898 A1 | 11/2002 | Ehrmann et al. | |
| 2002/0177288 A1 | 11/2002 | Brown et al. | |
| 2003/0010275 A1 | 1/2003 | Radojevic et al. | |
| 2003/0024909 A1 | 2/2003 | Hoekstra et al. | 219/121.69 |
| 2003/0141570 A1 | 7/2003 | Chen et al. | |
| 2004/0002199 A1 | 1/2004 | Fukuyo et al. | 438/460 |
| 2004/0245659 A1 | 12/2004 | Glenn et al. | |
| 2005/0173387 A1 | 8/2005 | Fukuyo et al. | |
| 2005/0181581 A1 | 8/2005 | Fukuyo et al. | |
| 2005/0184037 A1 | 8/2005 | Fukuyo et al. | |
| 2005/0189330 A1 | 9/2005 | Fukuyo et al. | |
| 2005/0202596 A1 | 9/2005 | Fukuyo et al. | |
| 2005/0272223 A1 | 12/2005 | Fujii et al. | |
| 2005/0282359 A1 | 12/2005 | Nagai et al. | |
| 2006/0040473 A1 | 2/2006 | Fukuyo et al. | |
| 2006/0144828 A1 | 7/2006 | Fukumitsu et al. | |
| 2006/0148212 A1 | 7/2006 | Fukuyo et al. | |
| 2006/0255024 A1 | 11/2006 | Fukuyo et al. | |
| 2007/0085099 A1 | 4/2007 | Fukumitsu et al. | |
| 2007/0125757 A1 | 6/2007 | Fukuyo et al. | |
| 2007/0252154 A1 | 11/2007 | Uchiyama et al. | |
| 2008/0035611 A1 | 2/2008 | Kuno et al. | |
| 2008/0037003 A1 | 2/2008 | Atsumi et al. | |
| 2008/0090382 A1 | 4/2008 | Fujii et al. | |
| 2008/0218735 A1 | 9/2008 | Atsumi et al. | |
| 2008/0251506 A1 | 10/2008 | Atsumi et al. | |
| 2009/0008373 A1 | 1/2009 | Muramatsu et al. | |
| 2009/0032509 A1 | 2/2009 | Kuno et al. | |
| 2009/0098713 A1 | 4/2009 | Sakamoto | |
| 2009/0107967 A1 | 4/2009 | Sakamoto et al. | |
| 2009/0117712 A1 | 5/2009 | Sakamoto et al. | |
| 2009/0166342 A1 | 7/2009 | Kuno et al. | |
| 2009/0166808 A1 | 7/2009 | Sakamoto et al. | |
| 2009/0250446 A1 | 10/2009 | Sakamoto | |
| 2009/0261083 A1 | 10/2009 | Osajima et al. | |
| 2009/0302428 A1 | 12/2009 | Sakamoto et al. | |
| 2010/0006548 A1 | 1/2010 | Atsumi et al. | |
| 2010/0009547 A1 | 1/2010 | Sakamoto | |
| 2010/0012632 A1 | 1/2010 | Sakamoto | |
| 2010/0012633 A1 | 1/2010 | Atsumi et al. | |
| 2010/0015783 A1 | 1/2010 | Fukuyo et al. | |
| 2010/0025386 A1 | 2/2010 | Kuno et al. | |
| 2010/0032418 A1 | 2/2010 | Kuno et al. | |
| 2010/0055876 A1 | 3/2010 | Fukuyo et al. | |
| 2010/0151202 A1 | 6/2010 | Fukumitsu | |
| 2010/0176100 A1 | 7/2010 | Fukuyo et al. | |
| 2010/0184271 A1 | 7/2010 | Sugiura et al. | |
| 2010/0200550 A1 | 8/2010 | Kumagai | |
| 2010/0203678 A1 | 8/2010 | Fukumitsu et al. | |
| 2010/0203707 A1 | 8/2010 | Fujii et al. | |
| 2010/0227453 A1 | 9/2010 | Sakamoto | |
| 2010/0240159 A1 | 9/2010 | Kumagai et al. | |
| 2010/0258539 A1 | 10/2010 | Sakamoto | |
| 2010/0301521 A1 | 12/2010 | Uchiyama | |
| 2010/0311313 A1 | 12/2010 | Uchiyama | |
| 2010/0327416 A1 | 12/2010 | Fukumitsu | |
| 2011/0000897 A1 | 1/2011 | Nakano et al. | |
| 2011/0001220 A1 | 1/2011 | Sugiura et al. | |
| 2011/0021004 A1 | 1/2011 | Fukuyo et al. | |
| 2011/0027971 A1 | 2/2011 | Fukuyo et al. | |
| 2011/0027972 A1 | 2/2011 | Fukuyo et al. | |
| 2011/0037149 A1 | 2/2011 | Fukuyo et al. | |
| 2011/0274128 A1 | 11/2011 | Fukumitsu et al. | |

FOREIGN PATENT DOCUMENTS

| | | |
|---|---|---|
| DE | 196 46 332 | 5/1998 |
| EP | 0213546 | 3/1987 |
| EP | 0345752 A2 | 12/1989 |
| EP | 0 863 231 | 9/1998 |
| EP | 1 022 778 A1 | 7/2000 |
| EP | 0126 735 A2 | 8/2000 |
| EP | 1 138 516 A2 | 10/2001 |
| EP | 1 338 371 A1 | 8/2003 |
| EP | 1 498 216 | 1/2005 |
| EP | 1 580 800 | 9/2005 |
| GB | 2 322 006 A | 8/1998 |
| JP | 46-024989 | 7/1971 |
| JP | 48-012599 | 2/1973 |
| JP | 53-33050 | 3/1978 |
| JP | 53-141573 | 12/1978 |
| JP | 56-76522 | 6/1981 |
| JP | 56-028630 | 7/1981 |
| JP | 56-128691 | 10/1981 |
| JP | 58-36939 | 3/1983 |
| JP | 58-57767 | 4/1983 |
| JP | 58-171783 | 10/1983 |
| JP | 58-181492 | 10/1983 |
| JP | 59-76687 | 5/1984 |
| JP | 59-130438 | 7/1984 |
| JP | 59-141233 | 8/1984 |
| JP | 59-150691 | 8/1984 |
| JP | 60-055640 | 3/1985 |
| JP | 60-144985 | 7/1985 |

(56) References Cited

FOREIGN PATENT DOCUMENTS

| | | |
|---|---|---|
| JP | 60-167351 | 8/1985 |
| JP | 61-96439 | 5/1986 |
| JP | 61-112345 | 5/1986 |
| JP | 61-121453 | 9/1986 |
| JP | 61-220339 | 9/1986 |
| JP | 62-004341 | 1/1987 |
| JP | 62-098684 A | 5/1987 |
| JP | 63-215390 | 9/1988 |
| JP | 63-278692 | 11/1988 |
| JP | 64-038209 | 2/1989 |
| JP | 1-112130 | 4/1989 |
| JP | 1-225509 | 9/1989 |
| JP | 1-225510 | 9/1989 |
| JP | 03-124486 | 5/1991 |
| JP | 03-234043 | 10/1991 |
| JP | 3-276662 | 12/1991 |
| JP | 03-281073 | 12/1991 |
| JP | 04-029352 | 1/1992 |
| JP | 04-111800 | 4/1992 |
| JP | 04-167985 | 6/1992 |
| JP | 4-188847 | 7/1992 |
| JP | 4-300084 | 10/1992 |
| JP | 04-339586 | 11/1992 |
| JP | 04-356942 | 12/1992 |
| JP | 05-335726 | 12/1993 |
| JP | 06-039572 | 2/1994 |
| JP | 06-188310 | 7/1994 |
| JP | 06-198475 | 7/1994 |
| JP | 07-029855 | 1/1995 |
| JP | 07-037840 | 2/1995 |
| JP | 07-040336 | 2/1995 |
| JP | 07-075955 A | 3/1995 |
| JP | 07-076167 | 3/1995 |
| JP | 7-32281 B2 | 4/1995 |
| JP | 7-263382 | 10/1995 |
| JP | 7-308791 | 11/1995 |
| JP | 8-148692 | 6/1996 |
| JP | 08-197271 | 8/1996 |
| JP | 8-264488 | 10/1996 |
| JP | 08-264491 | 10/1996 |
| JP | 09-017756 | 1/1997 |
| JP | 9-017831 | 1/1997 |
| JP | 09-150286 | 6/1997 |
| JP | 09-213662 A | 8/1997 |
| JP | 09-216085 A | 8/1997 |
| JP | 9-260310 | 10/1997 |
| JP | 9-263734 | 10/1997 |
| JP | 10-034359 A | 2/1998 |
| JP | 10-071483 | 3/1998 |
| JP | 10-163780 | 6/1998 |
| JP | 10-214997 | 8/1998 |
| JP | 10-233373 | 9/1998 |
| JP | 10-305420 | 11/1998 |
| JP | 10-321908 | 12/1998 |
| JP | 11-028586 A | 2/1999 |
| JP | 11-071124 | 3/1999 |
| JP | 11-121517 | 4/1999 |
| JP | 11-138896 | 5/1999 |
| JP | 11-156564 | 6/1999 |
| JP | 11-160667 | 6/1999 |
| JP | 11-162889 | 6/1999 |
| JP | 11-163097 | 6/1999 |
| JP | 11-163403 | 6/1999 |
| JP | 11-177137 | 7/1999 |
| JP | 11-177176 | 7/1999 |
| JP | 11-204551 A | 7/1999 |
| JP | 11-207479 | 8/1999 |
| JP | 11-221684 | 8/1999 |
| JP | 11-224866 | 8/1999 |
| JP | 11-267861 | 10/1999 |
| JP | 2000-9991 | 1/2000 |
| JP | 2000-015467 | 1/2000 |
| JP | 2000-042764 | 2/2000 |
| JP | 2000-61677 | 2/2000 |
| JP | 2000-104040 | 4/2000 |
| JP | 2000-124537 | 4/2000 |
| JP | 2000-158156 | 6/2000 |
| JP | 2000-195828 | 7/2000 |
| JP | 2000-210785 | 8/2000 |
| JP | 2000-216114 | 8/2000 |
| JP | 2000-219528 | 8/2000 |
| JP | 2000-237885 | 9/2000 |
| JP | 2000-237886 | 9/2000 |
| JP | 2000-247671 | 9/2000 |
| JP | 2000-249859 | 9/2000 |
| JP | 2000-294522 A | 10/2000 |
| JP | 2000-323441 A | 11/2000 |
| JP | 2000-349107 A | 12/2000 |
| JP | 2001-047264 | 2/2001 |
| JP | 2001-064029 | 3/2001 |
| JP | 2001-085736 | 3/2001 |
| JP | 2001-127015 | 5/2001 |
| JP | 2001-135654 A | 5/2001 |
| JP | 2001-144140 A | 5/2001 |
| JP | 2001-196282 | 7/2001 |
| JP | 2001-250798 | 9/2001 |
| JP | 2001-284292 A | 10/2001 |
| JP | 2001-326194 | 11/2001 |
| JP | 2001-345252 | 12/2001 |
| JP | 2002-026443 | 1/2002 |
| JP | 2002-047025 | 2/2002 |
| JP | 2002-050589 | 2/2002 |
| JP | 2002-158276 | 5/2002 |
| JP | 2002-192367 | 7/2002 |
| JP | 2002-192368 | 7/2002 |
| JP | 2002-192370 | 7/2002 |
| JP | 2002-192371 | 7/2002 |
| JP | 2002-205180 | 7/2002 |
| JP | 2002-205181 | 7/2002 |
| JP | 2002-224878 | 8/2002 |
| JP | 2002-226796 | 8/2002 |
| JP | 2002-192369 | 10/2002 |
| JP | 2003-001458 | 1/2003 |
| JP | 2003-017790 | 1/2003 |
| JP | 2003-39184 | 2/2003 |
| JP | 2003-046177 | 2/2003 |
| JP | 2003-154517 | 5/2003 |
| JP | 2003-334812 | 11/2003 |
| JP | 2003-338467 | 11/2003 |
| JP | 2003-338468 | 11/2003 |
| JP | 2003-338636 | 11/2003 |
| JP | 2005-001001 | 1/2005 |
| JP | 2005-047290 | 2/2005 |
| JP | 2005-159378 | 6/2005 |
| JP | 2005-159379 | 6/2005 |
| JP | 2005-313237 | 11/2005 |
| JP | 2006-128723 | 5/2006 |
| JP | 2006-135355 | 5/2006 |
| KR | 10-1999-0072974 | 9/1999 |
| KR | 2001-017690 | 3/2001 |
| KR | 2001-0017690 A | 3/2001 |
| TW | 165354 | 8/1991 |
| TW | 192484 | 10/1992 |
| TW | 219906 | 2/1994 |
| TW | 356613 | 4/1999 |
| TW | 388197 | 4/2000 |
| TW | 404871 | 9/2000 |
| TW | 415036 | 12/2000 |
| TW | 428295 | 4/2001 |
| TW | 440551 | 6/2001 |
| TW | 443581 | 6/2001 |
| TW | 445684 B | 7/2001 |
| TW | 455914 B | 9/2001 |
| TW | 473896 B | 1/2002 |
| TW | 488001 B | 5/2002 |
| TW | 494042 | 7/2002 |
| TW | 512451 | 12/2002 |
| TW | 521310 | 2/2003 |
| WO | WO-97/07927 A1 | 3/1997 |
| WO | WO-00/32349 A1 | 6/2000 |
| WO | WO 01/90709 | 11/2001 |
| WO | WO 02/07927 | 1/2002 |
| WO | WO 02/22301 | 3/2002 |

(56) References Cited

FOREIGN PATENT DOCUMENTS

| WO | WO 0222301 A1 * | 3/2002 | ............ B23K 26/04 |
| WO | WO 03/076118 A1 | 9/2003 | |
| WO | WO 2004/082006 | 9/2004 | |

OTHER PUBLICATIONS

Arai, K.; "Laser Dicing process for Si Wafer," Journal of the Japan Society of Griding Engineers, vol. 47, No. 5, May 2003; pp. 229-231, including English language translation.

Miyazaki, T., "Laser beam Machining Technology," published by Sangyo-Tosho Inc., May 31, 1991, First Edition pp. 9-10.

Yajima T. et al., New Version Laser Handbook, published by Asakusa Shoten, Jun. 15, 1989, pp. 666-669.

Tooling Machine Series, "Laser Machining" published by Taiga Shuppan Inc., 1990, pp. 91-96, including English language translation.

Electronic Material, No. 9 in 2002, published by Kogyo Chousaki, pp. 17-21 (with full English translation).

Fukuyo, F. et al., "Stealth Dicing Technology for Ultra Thin Wafer," presented at 2003 ICEP (international Conference on Electronics Packaging), Apr. 16-18, 2003, Tokyo, Japan.

Midorikawa, K., "Recent Progress of Femtosecond Lasers and their Applications to Material Processing," Dai 45 kai Laser Netsukako Kenkyukai Ronbunshu, December.

"Ultrashort Pulse Laser Microprocessing of Silicon," Japan Welding Society Zenkoku taikai Koen Gaiyo, Mar. 2000, pp. 72-73 (with English translation).

"Formation of Photo-included Structures in Glasses with Femtosecond Laser," dai 42 kai Laser Netsukako Kenkyukai Ronbunshu, Nov. 1997, pp. 107, line 4 to pp. 109, line 5.

"Inner Glass Marking by Harmonics of Solid State Laser," Dai 45 kai Laser Netsukako Kenkyukai Ronbunshu, Dec. 1998.

"Proceedings of the $63^{rd}$ Laser Materials Processing Conference," May 2005, pp. 115-123.

"The $6^{th}$ International Symposium on Laser Precision Microfabrication," Apr. 2005.

"Journal of Japan Laser Processing Society," vol. 12, No. 1, Feb. 2005 (with English translation).

Office Action dated Apr. 25, 2012 from related (not counterpart) U.S. Appl. No. 12/912,427 (33 pages).

U.S. Appl. No. 13/206,181, filed Aug. 9, 2011.
U.S. Appl. No. 13/269,274, filed Oct. 7, 2011.
U.S. Appl. No. 13/235,936, filed Sep. 19, 2011.
U.S. Appl. No. 13/233,662, filed Sep. 15, 2011.
U.S. Appl. No. 13/061,438, filed Apr. 26, 2011.
U.S. Appl. No. 13/107,056, filed May 13, 2011.
U.S. Appl. No. 13/151,877, filed Jun. 2, 2011.
U.S. Appl. No. 13/131,429, filed Jun. 28, 2011.
U.S. Appl. No. 13/143,636, filed Sep. 21, 2011.
U.S. Appl. No. 13/148,097, filed Aug. 26, 2011.
U.S. Appl. No. 13/262,995, filed Oct. 5, 2011.
U.S. Appl. No. 13/265,027, filed Oct. 18, 2011.
U.S. Appl. No. 13/213,175, filed Aug. 19, 2011.

X. Liu et al., "Laser Ablation and Micromachining with Ultrashort Laser Pulses," IEEE Journal of Quantum Electronics, vol. 33, No. 10, Oct. 1997, pp. 1706-1716.

Search Report, Oct. 8, 2012, Intellectual Property Office of Singapore.

K. Hirao et al., "Writing waveguides and gratings in silica and related materials by a femtosecond laser," Journal of Non-Crystalline Solids, vol. 239, Issues 1-3, Oct. 31, 1998, pp. 91-95.

U.S. Office Action dated May 28, 2013 issued in U.S. Appl. No. 13/529,525.

Non-Final Office Action of U.S. Appl. No. 13/529,525 mailed on Feb. 14, 2014.

Welding with High Power Diode Lasers, http://coherent.com/downloads/HPDDWeldingWhitepaper_Final.pdf.

* cited by examiner

LASER PROCESSING METHOD

TECHNICAL FIELD

The present invention relates to a processing method and, in particular, to a processing method using a laser.

BACKGROUND ART

Techniques for highly accurately cutting objects to be processed having various laminate structures such as those in which semiconductor active layers such as GaN are grown as crystals on an $Al_2O_3$ substrate for semiconductor devices and those in which glass substrates are bonded to other glass substrates for liquid crystal display devices have recently been in demand.

For cutting the objects to be processed having these laminate structures, it has conventionally been common to use a blade dicing or diamond scribe method.

The blade dicing method is a method in which an object to be processed is cut by being shaved with a diamond blade or the like. On the other hand, the diamond scribe method is a method in which a diamond point tool forms a scribe line on the front face of an object to be processed, and a knife edge is pressed against the rear face of the object along the scribe line, so as to break and cut the object.

However, sawdust or lubricant/washing water may enter a gap formed between a glass substrate and another glass substrate in the blade dicing method when the object is one for a liquid crystal display device mentioned above, for example.

In the diamond scribe method, on the other hand, a scribe line must be formed on not only the front face but also the rear face of the object when the object includes a substrate having a high hardness such as an $Al_2O_3$ substrate or when the object is one in which glass substrates are bonded together, whereby errors in cutting may occur because of a misalignment between the respective scribe lines formed on the front and rear faces.

DISCLOSURE OF THE INVENTION

In view of such circumstances, it is an object of the present invention to provide a laser cutting method which overcomes problems such as those mentioned above, and can cut an object to be processed with a high precision even when the object to be processed has various laminate structures.

In order to achieve the above-mentioned object, in one aspect, the present invention provides a laser processing method for cutting a flat object to be processed including a substrate and a laminate part disposed on the substrate, the method comprising the steps of attaching a protective film to a front face of the object on the laminate part side, irradiating the object with laser light while employing a rear face of the object as a laser light entrance surface and locating a light-converging point within the substrate so as to form a modified region due to multiphoton absorption, causing the modified region to form a cutting start region inside by a predetermined distance from the laser light entrance surface along a line along which the object is intended to be cut, attaching an expandable film to the rear face of the object, and expanding the expandable film so as to separate a plurality of parts produced upon cutting the object from the cutting start region acting as a start point from each other.

In another aspect, the present invention provides a laser processing method for cutting a flat object to be processed including a semiconductor substrate and a laminate part disposed on the semiconductor substrate, the method comprising the steps of attaching a protective film to a front face of the object on the laminate part side, irradiating the object with laser light while employing a rear face of the object as a laser light entrance surface and locating a light-converging point within the semiconductor substrate so as to form a molten processed region, causing the molten processed region to form a cutting start region inside by a predetermined distance from the laser light entrance surface along a line along which the object is intended to be cut, attaching an expandable film to the rear face of the object, and expanding the expandable film so as to separate a plurality of parts produced upon cutting the object from the cutting start region acting as a start point from each other.

By attaching a protective film to the front face of an object to be processed, these laser processing methods allow the object to be mounted on a table such that the rear face faces up, whereby the inside of the (semiconductor) substrate can favorably be irradiated with laser light from the rear face of the object. The modified region (molten processed region) formed by a phenomenon known as multiphoton absorption can form a cutting start region within the substrate along a desirable line to cut along which the object should be cut, whereby the object can be cut from the cutting start region acting as a start point. Attaching an expandable film to the rear face of the object and expanding the film can easily separate a plurality of cut parts of the object from each other. Namely, these laser processing method can form a cutting start region without directly irradiating the laminate part on the front face of the object with laser light, and cut the substrate by breaking it with a high precision while using a relatively small force from the cutting start region acting as a start point, thereby easily separating cut pieces of the object from each other. Therefore, even when the object to be processed has various laminate structures, these laser processing methods can cut the object with a high precision.

The laminate part on the substrate refers to one deposited on the front face of the substrate, one bonded to the front face of the substrate, one attached to the front face of the substrate, or the like, regardless of whether it is made of a material different from or identical to that of the substrate. The laminate part may be one disposed in close contact with the substrate, one disposed with a gap from the substrate, or the like. Its examples include a semiconductor active layer formed by crystal growth on the substrate, and other glass substrates bonded onto a glass substrate, whereas the laminate part include one in which a plurality of layers of different kinds of materials are formed. The inside of the substrate also encompasses the surface of the substrate provided with the laminate part. The light-converging point refers to a position where the laser light is converged. The cutting start region may be formed by a modified region formed continuously or by modified regions formed intermittently.

In still another aspect, the present invention provides a laser processing method for cutting a flat object to be processed including a substrate and a laminate part disposed on the substrate, the method comprising the steps of attaching a protective film to a front face of the object on the laminate part side, irradiating the object with laser light while employing a rear face of the object as a laser light entrance surface and locating a light-converging point within the substrate so as to form a modified region due to multiphoton absorption, causing the modified region to form a cutting start region inside by a predetermined distance from the laser light entrance surface along a line along which the object is intended to be cut, attaching an expandable film to the rear face of the object, applying an external force to the object so as to cut the object into a plurality of parts from the cutting start region acting as a start point, and expanding the expandable film so as to separate the plurality of parts of the object from each other.

In still another aspect, the present invention provides a laser processing method for cutting a flat object to be processed including a substrate and a laminate part disposed on the substrate, the method comprising the steps of attaching a protective film to a front face of the object on the laminate part side, irradiating the object with laser light while employing a rear face of the object as a laser light entrance surface and locating a light-converging point within the substrate so as to form a modified region due to multiphoton absorption, causing the modified region to form a cutting start region inside by a predetermined distance from the laser light entrance surface along a line along which the object is intended to be cut, attaching an expandable film to the rear face of the object, applying an external force to the object so as to cut the object into a plurality of parts from the cutting start region acting as a start point, and expanding the expandable film so as to separate the plurality of parts of the object from each other.

Even when the object to be processed has various laminate structures, these laser processing methods can cut the object with a high precision because of the same reason as with the laser processing methods mentioned earlier. Also, by applying an external force to the object when cutting the object into a plurality of parts, these methods can easily cut the object from the cutting start region acting as a start point.

In still another aspect, the present invention provides a laser processing method for cutting a flat object to be processed including a substrate and a laminate part disposed on the substrate, the method comprising the steps of attaching a protective film to a front face of the object on the laminate part side, irradiating the object with laser light while employing a rear face of the object as a laser light entrance surface and locating a light-converging point within the substrate so as to form a modified region due to multiphoton absorption, causing the modified region to form a cutting start region inside by a predetermined distance from the laser light entrance surface along a line along which the object is intended to be cut, attaching an expandable film to the rear face of the object, and expanding the expandable film so as to cut the object into a plurality of parts from the cutting start region acting as a start point and separate the plurality of parts of the object from each other.

In still another aspect, the present invention provides a laser processing method for cutting a flat object to be processed including a semiconductor substrate and a laminate part disposed on the semiconductor substrate, the method comprising the steps of attaching a protective film to a front face of the object on the laminate part side, irradiating the object with laser light while employing a rear face of the object as a laser light entrance surface and locating a light-converging point within the semiconductor substrate so as to form a molten processed region, causing the molten processed region to form a cutting start region inside by a predetermined distance from the laser light entrance surface along a line along which the object is intended to be cut, attaching an expandable film to the rear face of the object, and expanding the expandable film so as to cut the object into a plurality of parts from the cutting start region acting as a start point and separate the plurality of parts of the object from each other.

Even when the object to be processed has various laminate structures, these laser processing methods can cut the object with a high precision because of the same reason as with the laser processing methods mentioned earlier. Also, by expanding the expandable film, these methods can apply a tensile stress to the cutting start region of the object, thereby performing the step of cutting the object and the step of separating a plurality of parts from each other at the same time, thus reducing the number of manufacturing steps.

Preferably, in the above-mentioned laser processing methods in accordance with the present invention, the rear face of the object is shaved so as to thin the substrate of the object before forming the cutting start region in the object. This can accurately cut the object from the cutting start region acting as a start point with a smaller force or without requiring any special force.

Preferably, in the above-mentioned laser processing methods in accordance with the present invention, the protective film is removed after the expandable film is attached to the object. This can hold the object formed with the cutting start region without breaking it up. Alternatively, it will be preferred if the protective film is removed after a plurality of parts of the object are separated from each other by expanding the expandable film. This can protect a plurality of parts until the plurality of parts are taken out after the object is cut.

BEST MODES FOR CARRYING OUT THE INVENTION

In the following, a preferred embodiment of the present invention will be explained in detail with reference to the drawings. In the laser processing method in accordance with this embodiment, a modified region due to multiphoton absorption is formed within an object to be processed. Therefore, this laser processing method, multiphoton absorption in particular, will be explained first.

A material becomes transparent when its absorption bandgap $E_G$ is greater than photon energy hv. Hence, a condition under which absorption occurs in the material is $hv > E_G$. However, even when optically transparent, the material generates absorption under a condition of $nhv > E_G$ (where n=2, 3, 4, ...) if the intensity of laser light becomes very high. This phenomenon is known as multiphoton absorption. In the case of pulsed waves, the intensity of laser light is determined by the peak power density (W/cm$^2$) of laser light at a light-converging point. The multiphoton absorption occurs under a condition where the peak power density is $1 \times 10^8$ (W/cm$^2$) or greater, for example. The peak power density is determined by (energy of laser light at the light-converging point per pulse)/(beam spot cross-sectional area of laser light×pulse width). In the case of continuous waves, the intensity of laser light is determined by the field intensity (W/cm$^2$) of laser light at the light-converging point.

Figure 1:
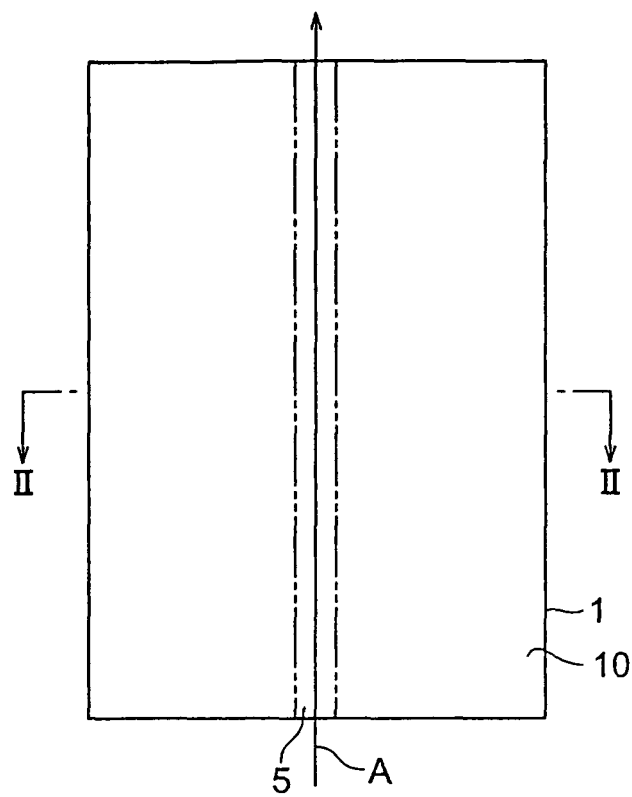
FIG. 1 is a plan view of an object to be processed during laser processing by the laser processing method in accordance with an embodiment.
Figure 2:
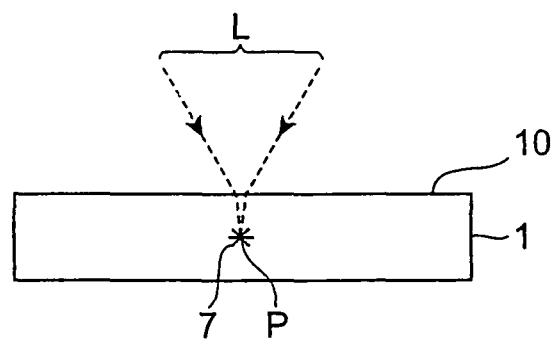
FIG. 2 is a sectional view of the object taken along the line II-II of FIG. 1.
Figure 3:
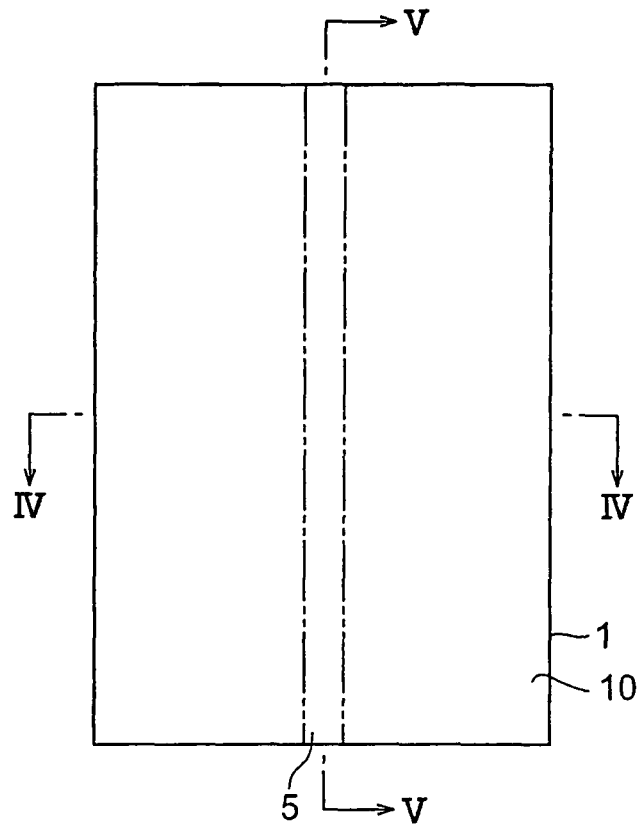
FIG. 3 is a plan view of the object after the laser processing by the laser processing method in accordance with the embodiment.
Figure 4:
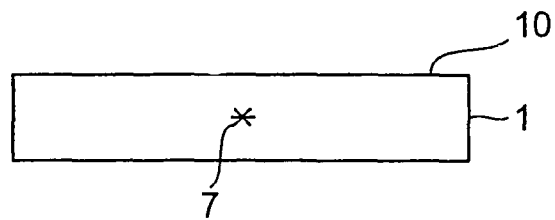
FIG. 4 is a sectional view of the object taken along the line IV-IV of FIG. 3.
Figure 5:
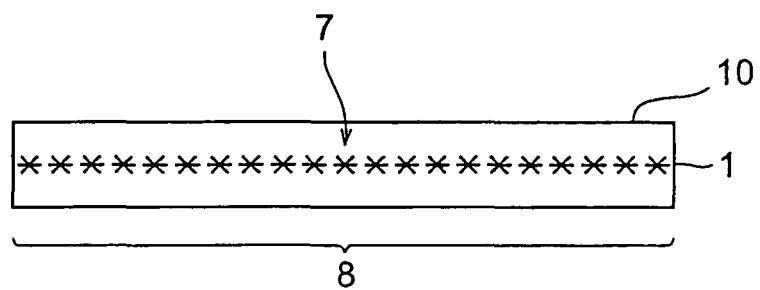
FIG. 5 is a sectional view of the object taken along the line V-V of FIG. 3.

The principle of the laser processing method in accordance with the embodiment using such multiphoton absorption will be explained with reference to FIGS. 1 to 6. FIG. 1 is a plan view of an object to be processed 1 during laser processing; FIG. 2 is a sectional view of the object 1 taken along the line II-II of FIG. 1; FIG. 3 is a plan view of the object 1 after the laser processing; FIG. 4 is a sectional view of the object 1 taken along the line IV-IV of FIG. 3; FIG. 5 is a sectional view of the object 1 taken along the line V-V of FIG. 3; and FIG. 6 is a plan view of the cut object 1.

As shown in FIGS. 1 and 2, a desirable line to cut 5 along which the object 1 should be cut exists on a surface 10 of the object 1. The line 5 along which the object is intended to be cut is a virtual line extending straight (though a line may actually be drawn on the object so as to become the line 5 along which the object is intended to be cut). The laser processing method in accordance with this embodiment irradiates the object 1 with laser light L while locating a light-converging point P therewithin under a condition generating multiphoton absorption, so as to form a modified region 7. The light-converging point P is a position at which the laser light L is converged. The surface 10 of the object 1 is a laser light entrance surface on which the laser light is incident, and is preferably a flat and smooth surface in order to prevent the laser light L from scattering over the surface 10.

The laser light L is relatively moved along the line 5 along which the object is intended to be cut (i.e., in the direction of arrow A in FIG. 1), so as to shift the light-converging point P along the line 5 along which the object is intended to be cut. Consequently, as shown in FIGS. 3 to 5, the modified region 7 is formed along the line 5 along which the object is intended to be cut only within the object 1, and becomes a cutting start region 8. In the laser processing method in accordance with this embodiment, the modified region 7 is not formed by the heat generated from the object 1 absorbing the laser light L. The laser light L is transmitted through the object 1, so as to generate multiphoton absorption therewithin, thereby forming the modified region 7. Therefore, the surface 10 of the object 1 hardly absorbs the laser light L, and thus does not melt.

Figure 6:
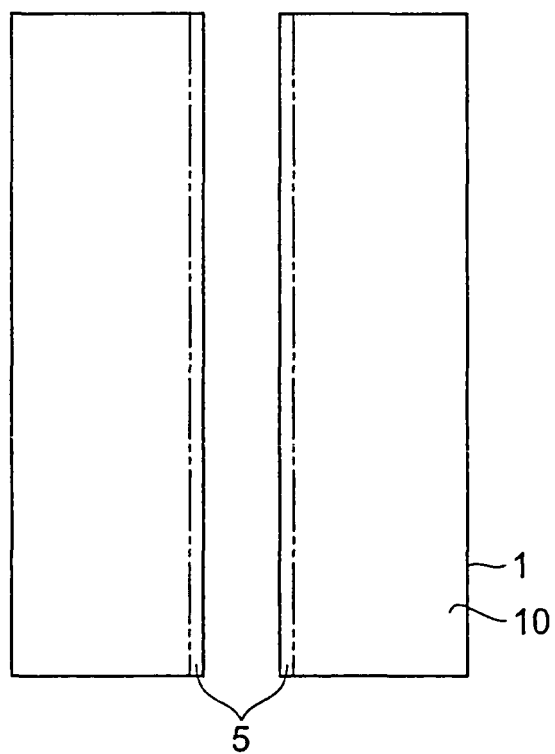
FIG. 6 is a plan view of the object cut by the laser processing method in accordance with the embodiment.

If a start point exists in a part to cut when cutting the object 1, the object 1 will break from the start point, whereby the object 1 can be cut with a relatively small force as shown in FIG. 6. Hence, the object 1 can be cut without generating unnecessary fractures in the surface 10 of the object 1.

The modified region formed by multiphoton absorption in the laser processing method in accordance with this embodiment encompasses the following cases (1) to (3):

(1) Case where the Modified Region is a Crack Region Including One Crack or a Plurality of Cracks A substrate (e.g., sapphire, glass, or a piezoelectric material made of LiTaO$_3$) is irradiated with laser light while locating a light-converging point therewithin under a condition with a field intensity of at least $1 \times 10^8$ (W/cm$^2$) at the light-converging point and a pulse width of 1 μs or less. This magnitude of pulse width is a condition under which a crack region can be formed only within the substrate while generating multiphoton absorption without causing unnecessary damages on the surface of the substrate. This generates a phenomenon of optical damage by multiphoton absorption within the substrate. This optical damage induces a thermal distortion within the substrate, thereby forming a crack region therewithin. The upper limit of field intensity is $1 \times 10^{12}$ (W/cm$^2$), for example. The pulse width is preferably 1 ns to 200 ns, for example.

The inventors determined the relationship between field intensity and crack size by an experiment. The following are conditions of the experiment.

(A) Substrate: Pyrex® glass (with a thickness of 700 μm)
(B) Laser
   light source: semiconductor laser pumping Nd:YAG laser
   wavelength: 1064 mm
   laser light spot cross-sectional area: $3.14 \times 10^{-8}$ cm$^2$
   oscillation mode: Q-switched pulse repetition frequency: 100 kHz
pulse width: 30 ns
output: output<1 mJ/pulse
laser light quality: TEM$_{00}$
polarizing property: linear polarization
(C) Condenser lens
transmittance at a laser light wavelength: 60%
(D) Moving rate of the mount table mounting the substrate: 100 mm/sec The laser light quality of TEM$_{00}$ means that the light-converging characteristic is so high that convergence to about the wavelength of laser light is possible.

Figure 7:
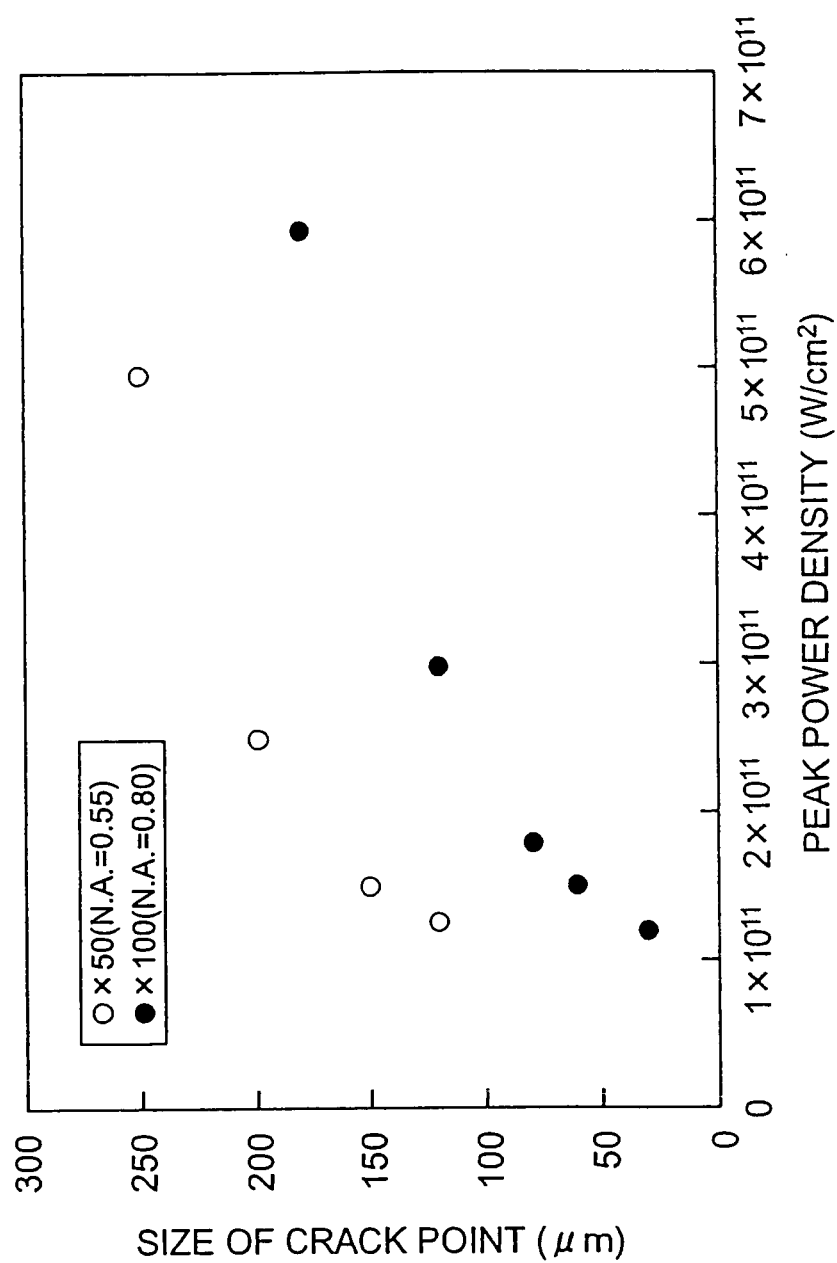
FIG. 7 is a graph showing relationships between the field intensity and crack spot size in the laser processing method in accordance with the embodiment.

FIG. 7 is a graph showing the results of the above-mentioned experiment. The abscissa indicates the peak power density. Since the laser light is pulsed laser light, the field intensity is represented by the peak power density. The ordinate indicates the size of a crack part (crack spot) formed within the substrate by one pulse of laser light. Crack spots gather to yield a crack region. The crack spot size is the size of a part yielding the maximum length among forms of crack spots. Data represented by black circles in the graph refer to a case where the condenser lens (C) has a magnification of ×100 and a numerical aperture (NA) of 0.80. On the other hand, data represented by whitened circles in the graph refer to a case where the condenser lens (C) has a magnification of ×50 and a numerical aperture (NA) of 0.55. Crack spots are seen to occur within the object from when the peak power density is about $10^{11}$ (W/cm$^2$) and become greater as the peak power density increases.

Figure 8:
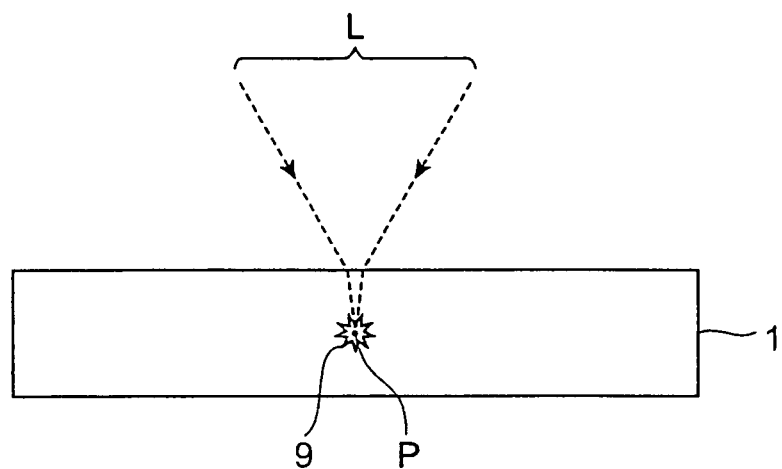
FIG. 8 is a sectional view of the object in a first step of the laser processing method in accordance with the embodiment.
Figure 9:
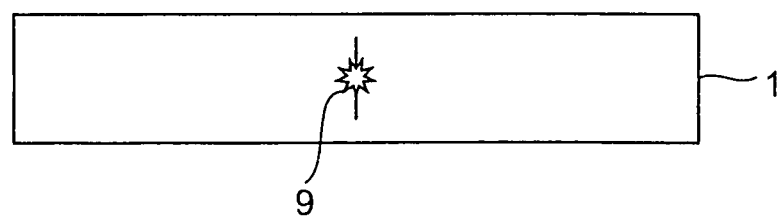
FIG. 9 is a sectional view of the object in a second step of the laser processing method in accordance with the embodiment.
Figure 10:
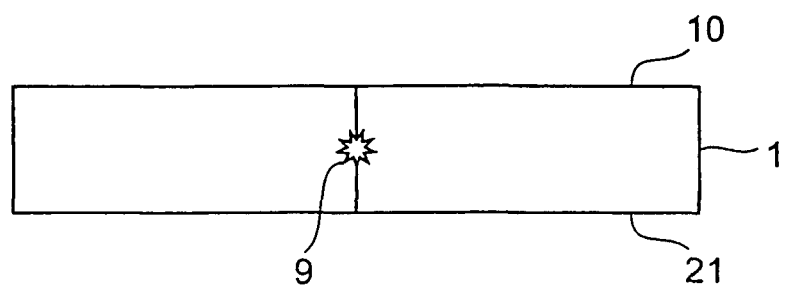
FIG. 10 is a sectional view of the object in a third step of the laser processing method in accordance with the embodiment.
Figure 11:
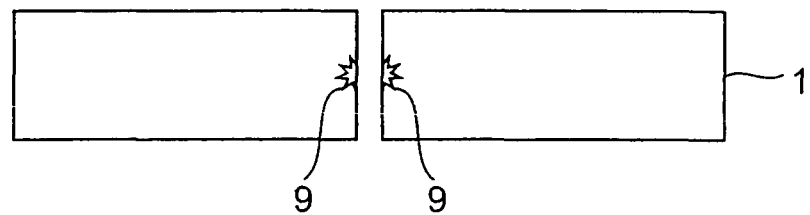
FIG. 11 is a sectional view of the object in a fourth step of the laser processing method in accordance with the embodiment.

A mechanism by which the objet to be processed is cut by forming a crack region will now be explained with reference to FIGS. 8 to 11. As shown in FIG. 8, the object 1 is irradiated with laser light L while the light-converging point P is located within the object 1 under a condition where multiphoton absorption occurs, so as to form a crack region 9 therewithin along a line along which the object is intended to be cut. The crack region 9 is a region containing one crack or a plurality of cracks. The crack region 9 forms a cutting start region. As shown in FIG. 9, when an artificial force (e.g., tensile stress) is applied to the object 1, a crack further grows from the crack region 9 acting as a start point (i.e., from the cutting start region acting as a start point), and reaches both faces of the object 1 as shown in FIG. 10, whereby the object 1 fractures and is consequently cut as shown in FIG. 11.

(2) Case where the Modified Region is a Molten Processed Region

A substrate (e.g., semiconductor material such as silicon) is irradiated with laser light while locating a light-converging point within the object under a condition with a field intensity of at least $1 \times 10^8$ (W/cm$^2$) at the light-converging point and a pulse width of 1 μs or less. As a consequence, the inside of the substrate is locally heated by multiphoton absorption. This heating forms a molten processed region within the substrate. The molten processed region encompasses regions once molten and then re-solidified, regions just in a molten state, and regions in the process of being re-solidified from the molten state, and can also be referred to as a region whose phase has changed or a region whose crystal structure has changed. The molten processed region may also be referred to as a region in which a certain structure changes to another structure among monocrystal, amorphous, and polycrystal structures. For example, it means a region having changed from the monocrystal structure to the amorphous structure, a region having changed from the monocrystal structure to the polycrystal structure, or a region having changed from the monocrystal structure to a structure containing amorphous and polycrystal structures. When the substrate is of a silicon monocrystal structure, the molten processed region is an amorphous silicon structure, for example. The upper limit of field intensity is $1 \times 10^{12}$ (W/cm$^2$), for example. The pulse width is preferably 1 ns to 200 ns, for example.

By an experiment, the inventors verified that a molten processed region was formed within a silicon wafer. The following are conditions of the experiment.

Figure 12:
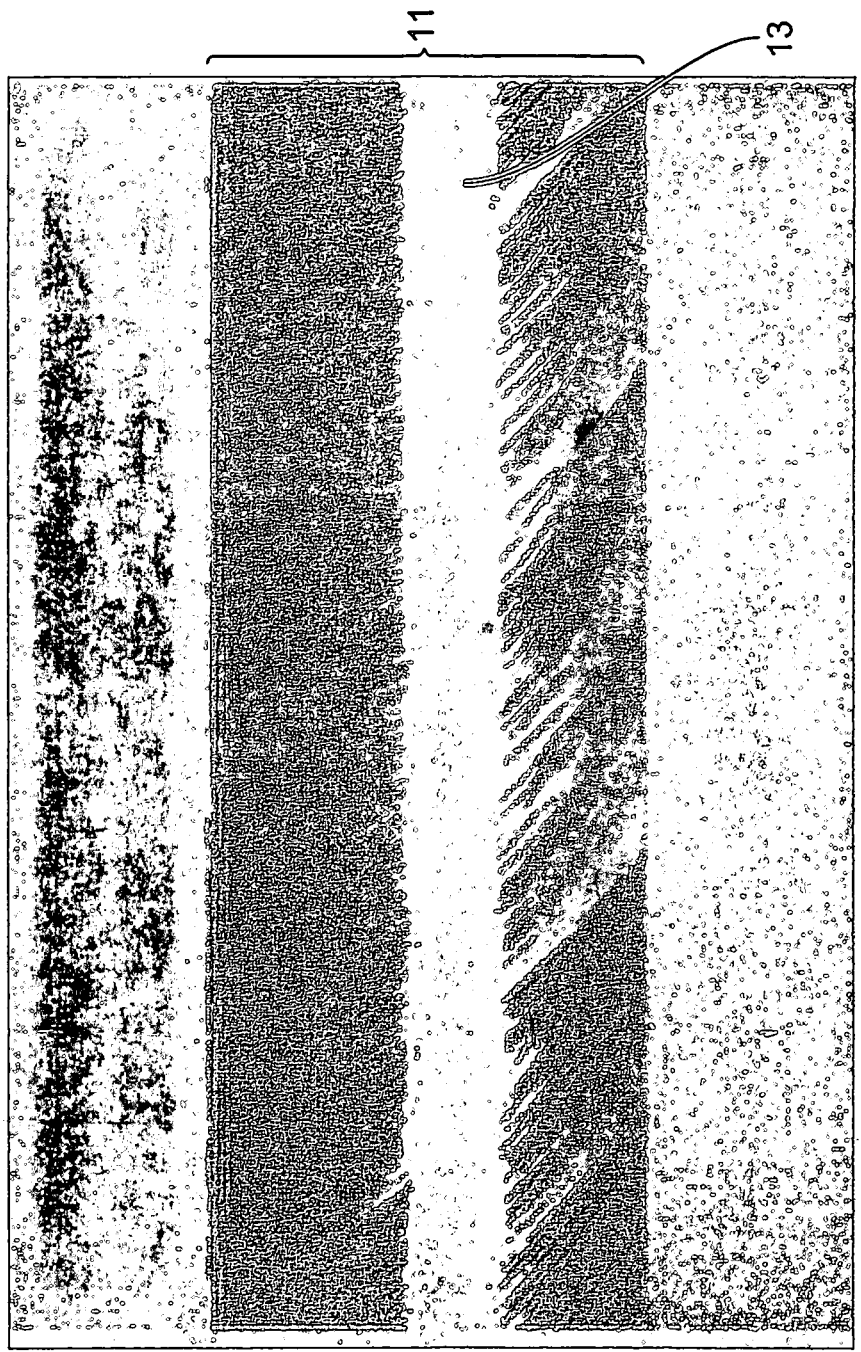
FIG. 12 is a view showing a photograph of a cross section in a part of a silicon wafer cut by the laser processing method in accordance with the embodiment.

(A) Object to be processed: silicon wafer (with a thickness of 350 μm and an outer diameter of 4 inches)
(B) Laser
light source: semiconductor laser pumping Nd:YAG laser
wavelength: 1064 nm
laser light spot cross-sectional area: $3.14 \times 10^{-8}$ cm$^2$
oscillation mode: Q-switched pulse
repetition frequency: 100 kHz
pulse width: 30 ns
output: 20 μJ/pulse
laser light quality: TEM$_{00}$
polarizing property: linear polarization
(C) Condenser lens
magnification: ×50
N.A.: 0.55
transmittance at a laser light wavelength: 60%
(D) Moving rate of the mount table mounting the object: 100 mm/sec FIG. 12 is a view showing a photograph of a cross section of a part of a silicon wafer cut by laser processing under the conditions mentioned above. A molten processed region 13 is formed within the silicon wafer 11. The molten processed region 13 formed under the above-mentioned conditions has a size of about 100 μm in the thickness direction.

Figure 13:
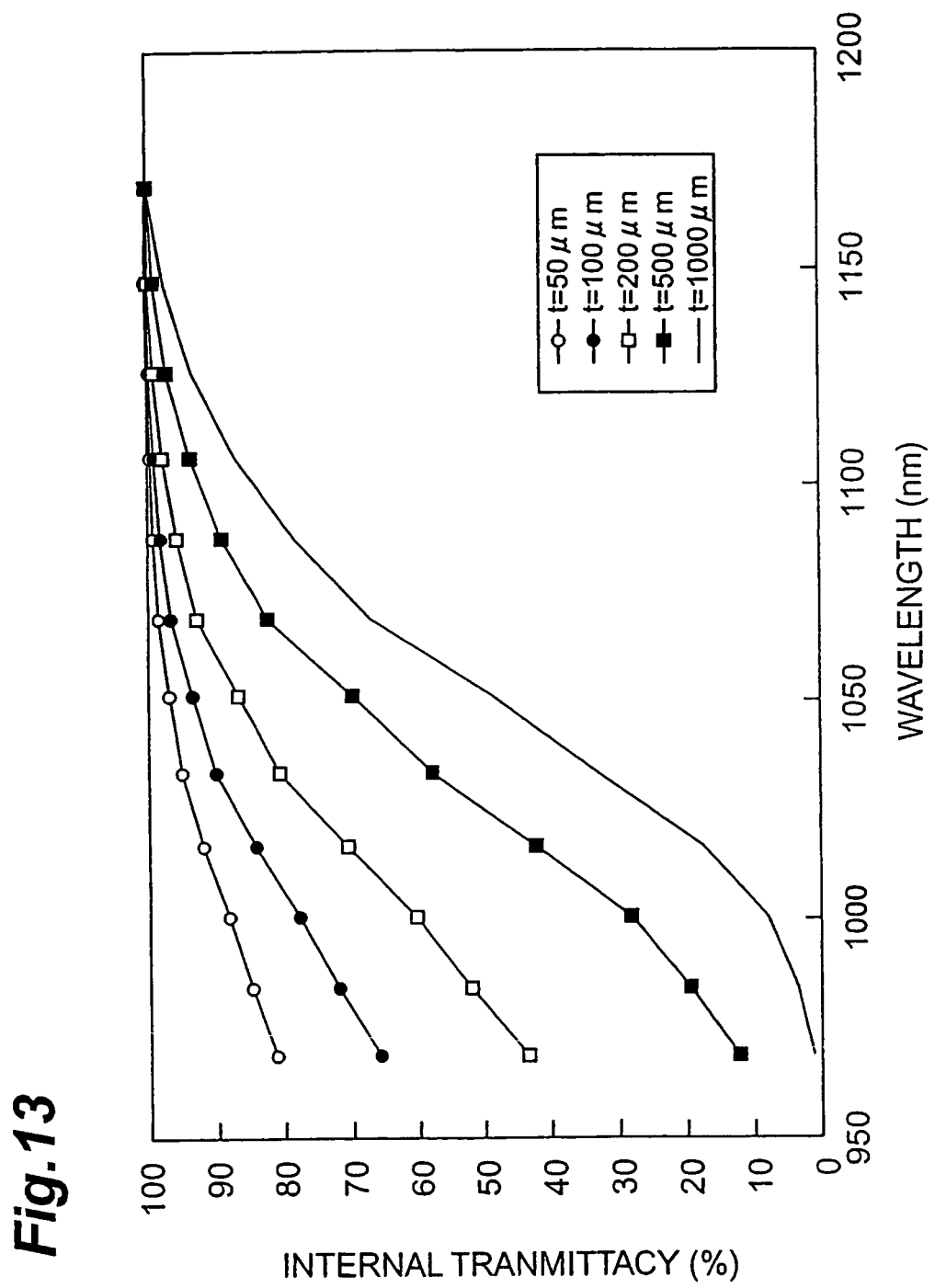
FIG. 13 is a graph showing relationships between laser light wavelength and transmittance within a silicon substrate in the laser processing method in accordance with the embodiment.

The fact that the molten processed region 13 is formed by multiphoton absorption will now be explained. FIG. 13 is a graph showing relationships between the laser light wavelength and the transmittance within the silicon substrate. Here, the respective reflected components on the front and rear sides of the silicon substrate are eliminated, so as to show the internal transmittance alone. The respective relationships are shown in the cases where the thickness t of the silicon substrate is 50 μm, 100 μm, 200 μm, 500 μm, and 1000 μm.

For example, at the Nd:YAG laser wavelength of 1064 nm, the laser light appears to be transmitted through the silicon substrate by at least 80% when the silicon substrate has a thickness of 500 μm or less. Since the silicon wafer 11 shown in FIG. 12 has a thickness of 350 μm, the molten processed region 13 caused by multiphoton absorption is positioned at a part distanced from the front face of the silicon wafer 11 by 175 μm when formed near the center of the silicon wafer 11. The transmittance in this case is 90% or more with reference to a silicon wafer having a thickness of 200 μm, whereby the laser light is absorbed only slightly within the silicon wafer 11 but is substantially transmitted therethrough. This means that the molten processed region 13 is formed within the silicon wafer 11 not by laser light absorption within the silicon wafer 11 (i.e., not by usual heating with the laser light) but by multiphoton absorption.

A fracture is generated in a silicon wafer from a cutting start region formed by a molten processed region, acting as a start point, toward a cross section, and reaches the front and rear faces of the silicon wafer, whereby the silicon wafer is cut. According to studies conducted by the inventors, fractures seem to start from the molten processed region since distortions are likely to occur within the silicon wafer because of physical differences between the molten processed region and the other regions. On the other hand, as can be seen from the photograph shown in FIG. 12, pointed molten scars exist above and under the molten processed region 13. The molten scars seem to allow the fracture starting from the molten processed region to reach both faces of the silicon wafer accurately. The molten processed region is formed only within the silicon wafer, and thus is present only within the cut section after cutting as shown in FIG. 12. When a cutting start region is formed within the substrate by a molten processed region as such, unnecessary fractures deviating from a cutting start region line are harder to occur at the time of cutting, whereby the cutting control becomes easier.

(3) Case where the Modified Region is a Refractive Index Change Region

A substrate (e.g., glass) is irradiated with laser light while locating a light-converging point within the substrate under a condition with a field intensity of at least $1 \times 10^8$ (W/cm$^2$) at the light-converging point and a pulse width of 1 ns or less. When multiphoton absorption is generated within the substrate with a very short pulse width, the energy caused by multiphoton absorption is not converted into thermal energy, whereby an eternal structure change such as ion valence change, crystallization, or orientation polarization is induced within the substrate, thus forming a refractive index change region. The upper limit of field intensity is $1 \times 10^{12}$ (W/cm$^2$), for example. The pulse width is preferably 1 ns or less, for example, more preferably 1 ps or less.

While the cases (1) to (3) are explained in the foregoing as a modified region formed by multiphoton absorption, a cutting start region may be formed as follows in view of the crystal structure of an object to be processed, its cleavage characteristic, and the like, whereby the object can be cut with a high precision by a smaller force from the cutting start region acting as a start point.

Namely, in the case of a substrate made of a monocrystal semiconductor having a diamond structure such as silicon, it will be preferred if a cutting start region is formed in a direction extending along a (111) plane (first cleavage plane) or a (110) plane (second cleavage plane). In the case of a substrate made of a III-V family compound semiconductor of sphalerite structure such as GaAs, it will be preferred if a cutting start region is formed in a direction extending along a (110) plane. In the case of a substrate having a crystal structure of hexagonal system such as sapphire (Al$_2$O$_3$), it will be preferred if a cutting start region is formed in a direction extending along a (1120) plane (A plane) or a (1100) plane (M plane) while using a (0001) plane (C plane) as a principal plane.

When cutting a disk-shaped wafer as a substrate, for example, if the wafer is formed with an orientation flat in a direction to be formed with the above-mentioned cutting start region (e.g., a direction extending along a (111) plane in a monocrystal silicon substrate) or a direction orthogonal to the direction to be formed therewith, the cutting start region extending in the direction to be formed with the cutting start region can be formed easily and accurately with reference to the orientation flat.

Figure 14:
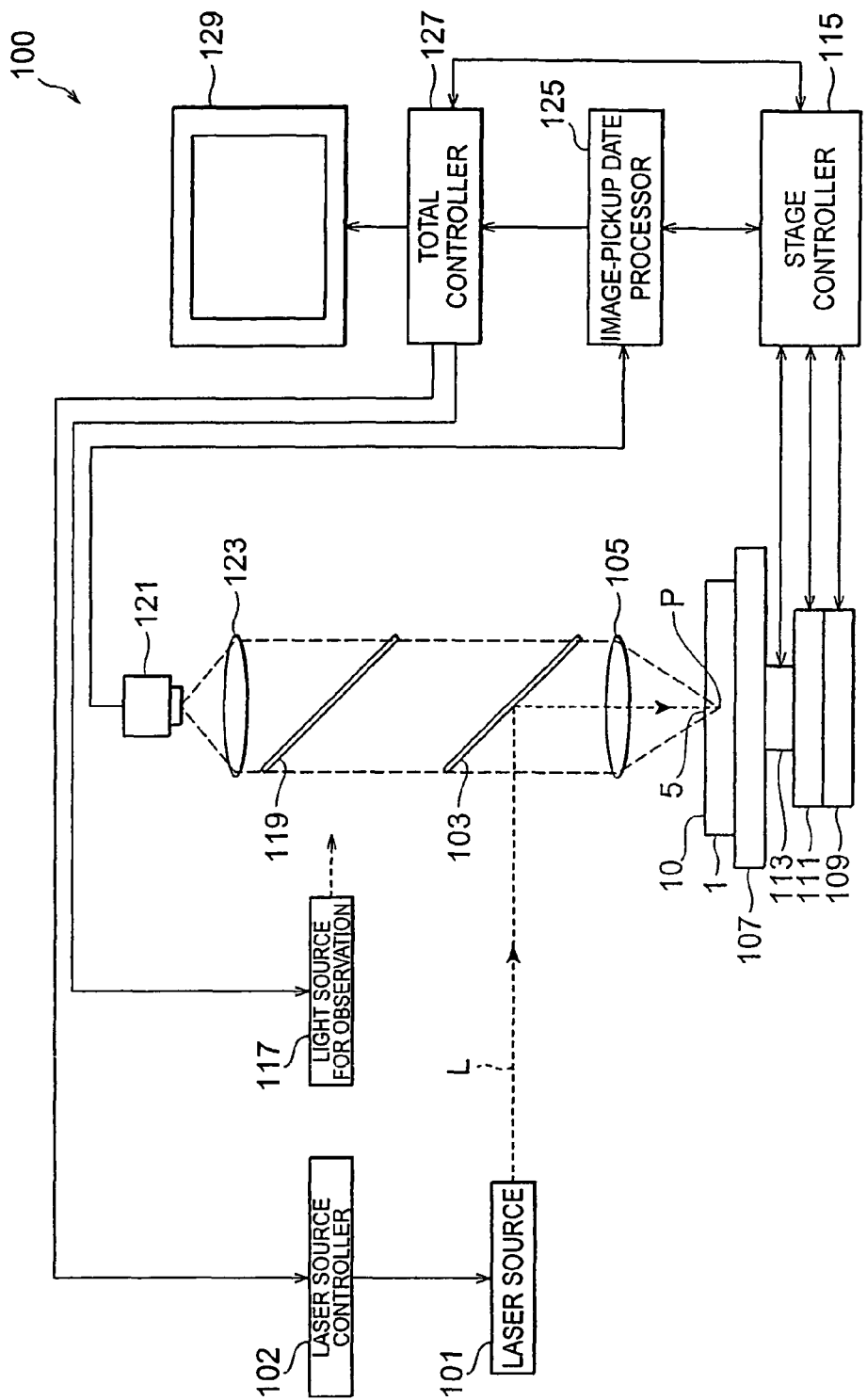
FIG. 14 is a schematic diagram of the laser processing apparatus in accordance with the embodiment.

A laser processing apparatus employed in the above-mentioned laser processing method will now be explained with reference to FIG. 14. FIG. 14 is a schematic diagram of a laser processing apparatus 100.

The laser processing apparatus 100 comprises a laser light source 101 for generating laser light L; a laser light source controller 102 for regulating the laser light source 101 so as to adjust the output, pulse width, and the like of the laser light L; a dichroic mirror 103 which functions to reflect the laser light L and is disposed so as to change the orientation of the optical axis by 90°; a condenser lens 105 for converging the laser light L reflected by the dichroic mirror 103; a mount table 107 for mounting the object 1 irradiated with the laser light L converged by the condenser lens 105; an X-axis stage 109 for moving the mount table 107 along an X axis; a Y-axis stage 111 for moving the mount table 107 along a Y axis orthogonal to the X axis; a Z-axis stage 113 for moving the mount table 107 along a Z axis orthogonal to the X and Y axes; and a stage controller 115 for regulating the movements of the three stages 109, 111, 113.

The movement of the light-converging point P along the X (Y) axis is effected by causing the X (Y)-axis stage 109 (111) to move the object 1 along the X (Y) axis. The Z axis is a direction orthogonal to the surface 10 of the object 1, and thus is a focal depth direction of the laser light L incident on the object 1. Hence, the light-converging point P of the laser light L can be positioned within the object 1 when the Z-axis stage 113 is moved along the Z axis.

The laser light source 101 is an Nd:YAG laser which generates pulsed laser light. Other examples of lasers usable in the laser light source 101 include Nd:YVO$_4$, Nd:YLF, and titanium:sapphire lasers. Though pulsed laser light is used for processing the object 1 in this embodiment, continuous-wave laser light may also be used as long as it can cause multiphoton absorption.

The laser processing apparatus 100 further comprises an observation light source 117 which generates visible rays for illuminating the object 1 mounted on the mount table 107; and a beam splitter 119, disposed on the same optical axis as with the dichroic mirror 103 and condenser lens 105, for visible rays. The dichroic mirror 103 is disposed between the beam splitter 119 and the condenser lens 105. The beam splitter 119 functions to reflect about a half of the visible rays and transmit the remaining half therethrough, and is disposed so as to change the orientation of the optical axis of visible rays by 90°. About a half of the visible rays generated by the observation light source 117 are reflected by the beam splitter 119, and thus reflected visible rays are transmitted through the dichroic mirror 103 and condenser lens 105, so as to illuminate the surface 10 of the object 1 including a line 5 along which the object is intended to be cut and the like.

The laser processing apparatus 100 further comprises an image pickup device 121 and an imaging lens 123 which are disposed on the same optical axis as with the beam splitter 119, dichroic mirror 103, and condenser lens 105. An example of the image pickup device 121 is a CCD camera. Reflected light of the visible rays having illuminated the surface 10 including the line 5 along which the object is intended to be cut and the like is transmitted through the condenser lens 105, dichroic mirror 103, and beam splitter 119, so as to be focused by the imaging lens 123 and captured by the imaging device 121, thus becoming imaging data.

The laser processing apparatus 100 further comprises an imaging data processor 125 into which the imaging data outputted from the imaging device 121 is fed, an overall controller 127 for controlling the laser processing apparatus as a whole, and a monitor 129. According to the imaging data, the imaging data processor 125 calculates focal data for positioning the focal point of visible rays generated by the observation light source 117 onto the surface 10 of the object 1. According to the focal data, the stage controller 115 regulates the movement of the Z-axis stage 113 such that the focal point of visible rays is positioned on the surface 10 of the object 1. Hence, the imaging data processor 125 functions as an autofocus unit. Also, according to the imaging data, the imaging data processor 125 calculates image data such as enlarged images of the surface 10. The image data are sent to the overall controller 127, so as to be subjected to various kinds of processing therein, and then to the monitor 129. As a consequence, an enlarged image and the like are displayed on the monitor 129.

The overall controller 127 is also fed with data from the stage controller 115, image data from the imaging data processor 125, and the like, and controls the laser light source controller 102, observation light source 117, and stage controller 115 according to these data as well, thereby regulating the laser processing apparatus 100 as a whole. Hence, the overall controller 127 functions as a computer unit.

Figure 15:
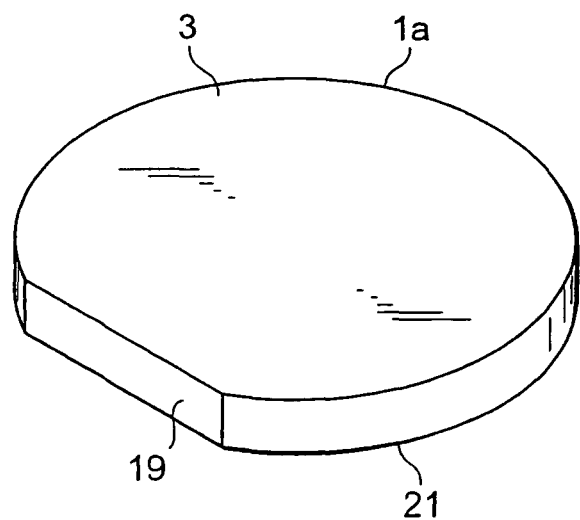
FIG. 15 is a perspective view showing a wafer employed in the laser processing method in accordance with the embodiment.
Figure 16:
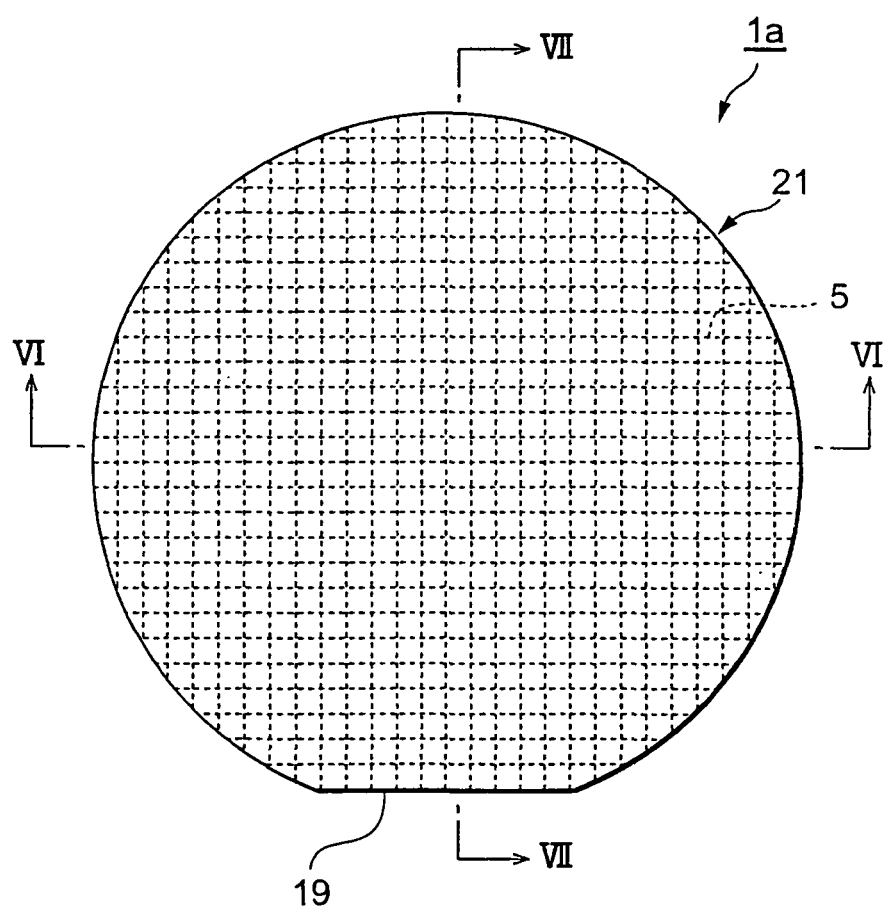
FIG. 16 is a plan view of the wafer shown in FIG. 15.
Figure 17:
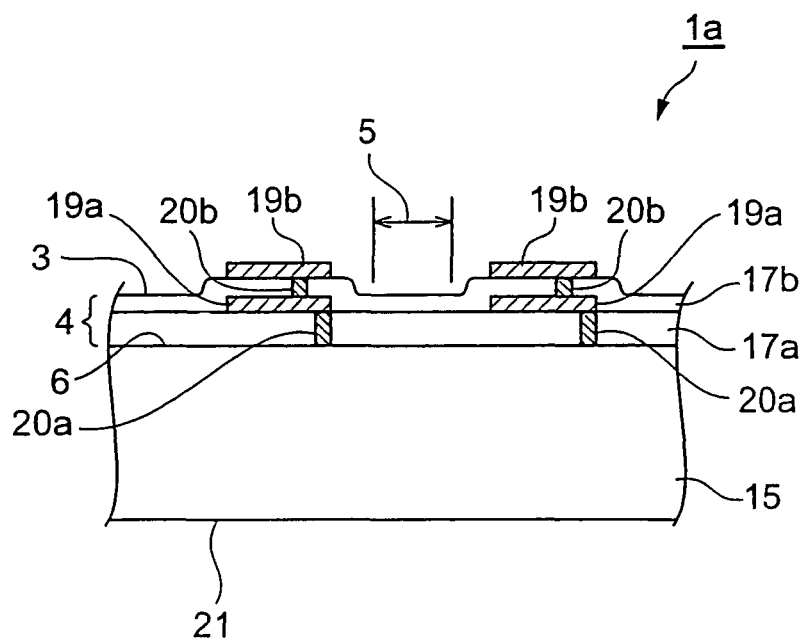
FIG. 17 is an enlarged view showing the VI-VI and VII-VII sections of the wafer shown in FIG. 16.

The laser processing method in accordance with the embodiment using the above-mentioned laser processing apparatus 100 will now be explained. FIG. 15 is a perspective view showing a wafer 1a which is an object to be processed in the laser processing method in accordance with the embodiment. FIG. 16 is a bottom view of the wafer 1a shown in FIG. 15. FIG. 17 is an enlarged view showing the VI-VI and VII-VII sections of the wafer 1a shown in FIG. 16.

With reference to FIGS. 15 to 17, the wafer 1a is flat and substantially shaped like a disk. With reference to FIG. 16, a plurality of lines 5 along which the object is intended to be cut intersecting with each other vertically and horizontally are set in the rear face 21 of the wafer 1a. The lines 5 along which the object is intended to be cut are virtual lines set for cutting the wafer 1a into a plurality of chip-like parts. It will be preferred if the lines 5 along which the object is intended to be cut are set along cleavage planes of the wafer 1a, for example.

The wafer 1a also has an orientation flat (hereinafter referred to as "OF") 19. In this embodiment, the OF 19 is formed with its longitudinal direction aligning with a direction parallel to one of directions of the lines 5 along which the object is intended to be cut intersecting with each other vertically and horizontally. The OF 19 is provided for making it easier to identify a cutting direction when cutting the wafer 1a along the lines 5 along which the object is intended to be cut.

Referring to FIG. 17, the wafer 1a comprises a substrate 15 made of a semiconductor (Si), and a laminate part 4 laminated on a surface 6 of the substrate 15. The laminate part 4 includes interlayer insulating layers 17a and 17b made of an insulative material ($SiO_2$), and first wiring layers 19a and second wiring layers 19b which are made of a metal (W). The interlayer insulating layer 17a is laminated on the surface 6 of the substrate 15, whereas the first wiring layers 19a are laminated on a plurality of device forming regions set so as to be separated from each other. The first wiring layers 19a are electrically connected to the substrate 15 by respective plugs 20a provided so as to penetrate through the interlayer insulating layer 17a. The interlayer insulating layer 17b is laminated on the interlayer insulating layer 17a and first wiring layers 19a, whereas the second wiring layers 19b are laminated on regions, on the interlayer insulating layer 17b, corresponding to the first wiring layers 19a. The second wiring layers 19b are electrically connected to their corresponding first wiring layers 19a by respective plugs 20b provided so as to penetrate through the interlayer insulating layer 17b.

The lines 5 along which the object is intended to be cut are set in regions in gaps between the second wiring layers 19b on the interlayer insulating layer 17b. In the lines 5 along which the object is intended to be cut, the surface of the interlayer insulating layer 17b (i.e., the front face 3 of the wafer 1a) is a flat and smooth surface.

FIRST EXAMPLE

Figure 18:
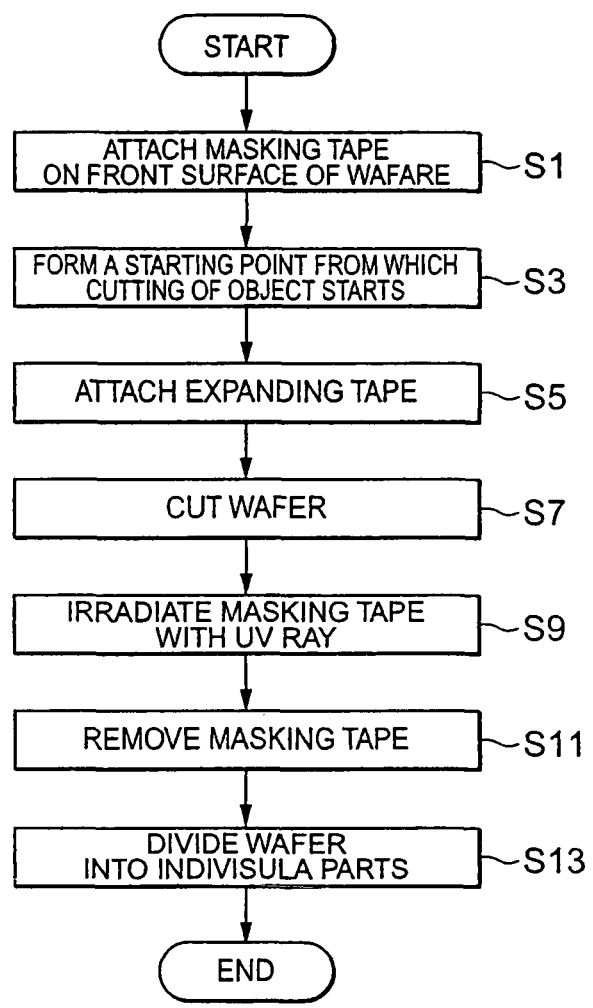
FIG. 18 is a flowchart for explaining a first example of the laser processing method in accordance with the embodiment.
Figure 19:
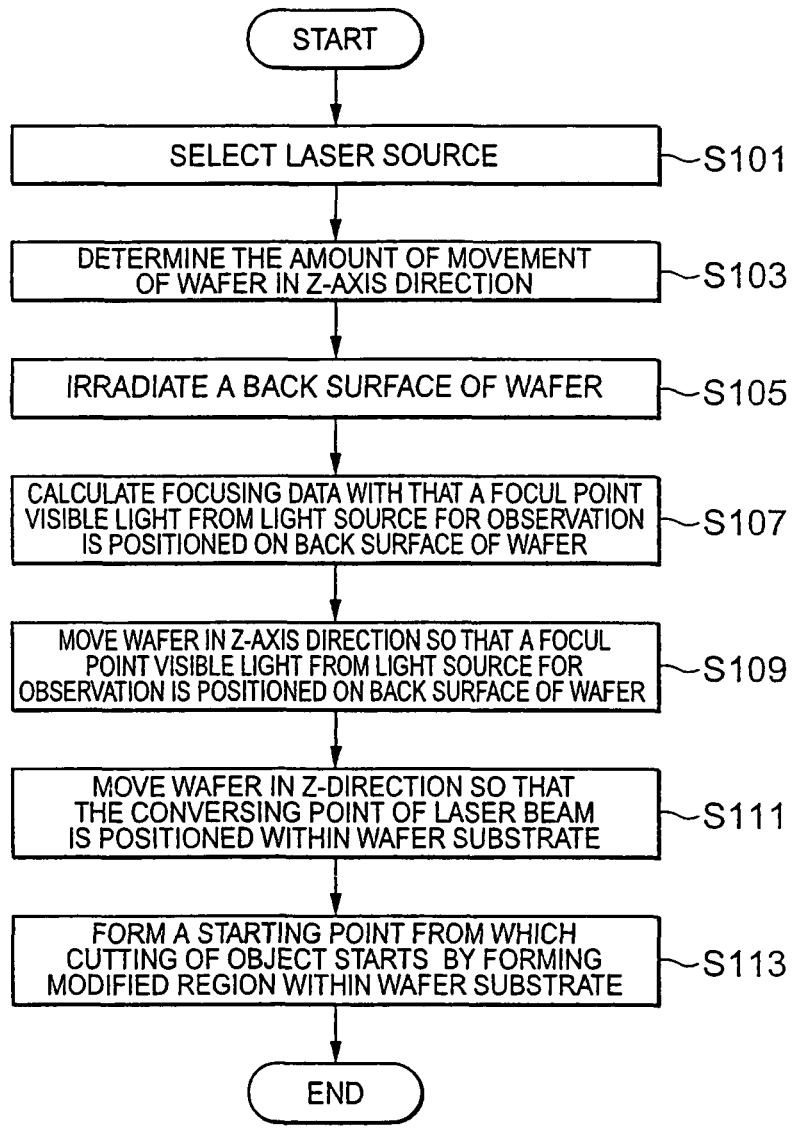
FIG. 19 is a flowchart for explaining a method of forming a cutting start region in the wafer by using the laser processing apparatus shown in FIG. 14.

FIGS. 18 and 19 are flowcharts for explaining a first example of the laser processing method in accordance with the embodiment. FIGS. 20 to 22 are sectional views of the wafer 1a for explaining the laser processing method in accordance with this example.

Figure 20A:
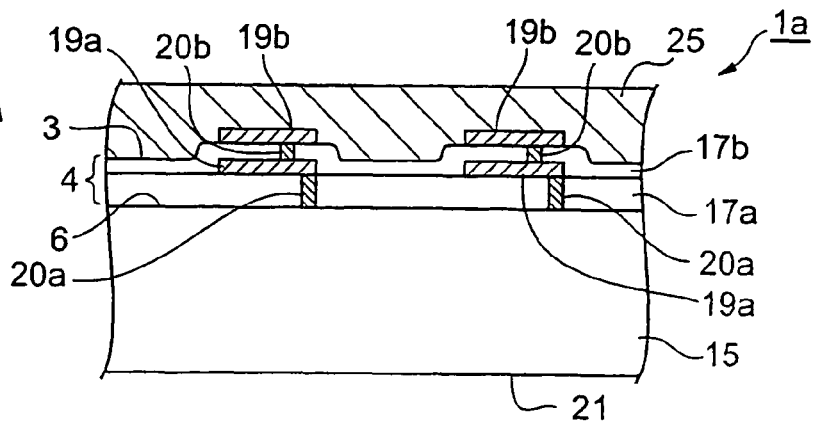
FIGS. 20A to 20C are sectional views of the wafer for explaining the laser processing method in accordance with the first example.

Referring to FIG. 18, a protective tape 25 as a protective film for protecting a laminate 4 is initially attached to the front face 3 of the wafer 1a (S1, FIG. 20A). Various materials can be used as a material for the protective tape 25 as long as they have a cushioning effect for protecting the laminate part 4 and do not affect operating characteristics of the laminate part 4. Chosen as the material for the protective tape 25 in this embodiment is one which can absorb shocks while being removable when irradiated with UV rays.

Figure 20B:
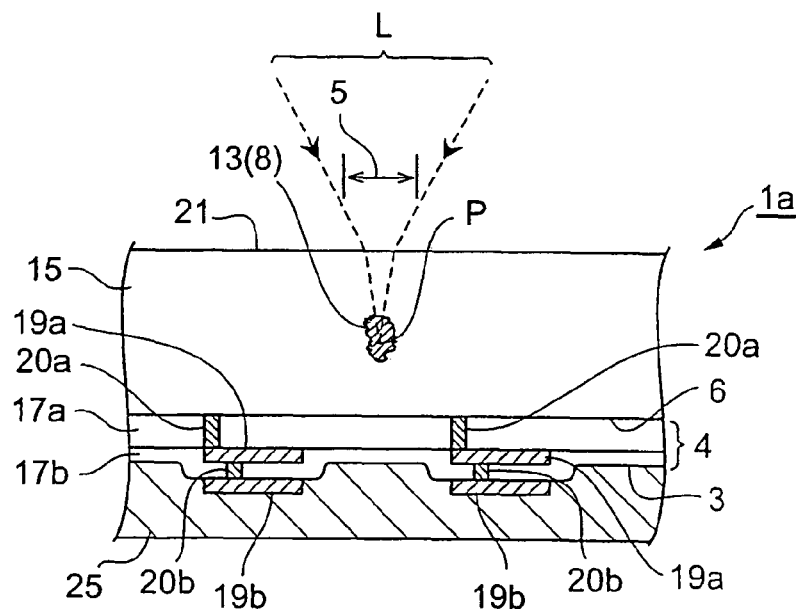

Subsequently, a cutting start region 8 is formed within the substrate 15 of the wafer 1a along a line 5 along which the object is intended to be cut (S3, FIG. 20B). The wafer 1a shown in FIG. 20B is illustrated such that the front face 3 is located on the lower side of the drawing. Namely, the laser light L is emitted to a light-converging point P within the substrate 15 while employing a region corresponding to the line 5 along which the object is intended to be cut in the rear face 21 of the wafer 1a as a laser light entrance surface, whereby a molten processed region 13 is formed as a modified region within the substrate 15. The molten processed region 13 becomes a cutting start region 8 when cutting the wafer 1a.

FIG. 19 is a flowchart showing a method of forming the cutting start region 8 in the wafer 1a by using the laser processing apparatus 100 shown in FIG. 14. In this embodiment, the wafer 1a is disposed on the mount table 107 of the laser processing apparatus 100 such that the rear face 21 opposes the condenser lens 105. Namely, the laser light L is incident on the wafer 1a from the rear face 21 thereof.

Referring to FIGS. 14 and 19, the light absorption characteristic of the substrate 15 is initially measured by a spectrophotometer or the like which is not depicted. According to the result of measurement, a laser light source 101 having a wavelength to which the substrate 15 is transparent or less absorptive is chosen (S101).

Subsequently, in view of the thickness, material, refractive index, and the like of the substrate 15, the amount of movement of the wafer 1a along the Z axis is determined (S103). This is the amount of movement of the wafer 1a, with reference to the light-converging point P of laser light positioned at the rear face 21 of the wafer 1a, required for locating the light-converging point P of laser light L at a desirable position inside by a predetermined distance from the rear face 21 of the wafer 1a. This amount of movement is fed into the overall controller 127.

The wafer 1a is mounted on the mount table 107 of the laser processing apparatus 100 such that the rear face 21 of the wafer 1a opposes the condenser lens 105. Here, since the protective tape 25 is attached to the front face 3 of the wafer 1a provided with the laminate part 4, the wafer 1a can be mounted on the mount table 107 with the front face 3 facing down without any problems. Then, visible rays are generated by the observation light source 117, so as to illuminate the rear face 21 of the wafer 1a (S105). The illuminated rear face 21 of the wafer 1a is captured by the image pickup device 121. The imaging data captured by the image pickup device 121 is sent to the imaging data processor 125. According to the imaging data, the imaging data processor 125 calculates such focal data as to position the focal point of visible rays from the observation light source 117 at the rear face 21 of the wafer 1a (S107).

The focal data is sent to the stage controller 115. According to the focal data, the stage controller 115 moves the Z-axis stage 113 along the Z axis (S109). As a consequence, the focal point of visible rays from the observation light source 117 is positioned at the rear face 21 of the wafer 1a. According to the imaging data, the imaging data processor 125 calculates enlarged image data of the rear face 21 including the line 5 along which the object is intended to be cut. The enlarged image data is sent to the monitor 129 by way of the overall controller 127, whereby an enlarged image of the line 5 along which the object is intended to be cut and its vicinity is displayed on the monitor 129.

Data of the movement amount determined by step S103 has been fed into the overall controller 127 beforehand, and is sent to the stage controller 115. According to the movement amount data, the stage controller 115 causes the Z-axis stage 113 to move the wafer 1a along the Z axis such that the position of the light-converging point P of laser light L is inside by a predetermined distance from the rear face 21 of the wafer 1a (S111).

Subsequently, the laser light source 101 generates laser light L, with which the rear face 21 of the wafer 1a is irradiated. Since the light-converging point P of laser light L is positioned within the substrate 15, a molten processed region 13, which is a modified region, is formed only within the substrate 15. Then, the X-axis stage 109 or Y-axis stage 111 is moved along the line 5 along which the object is intended to be cut, so as to form a plurality of molten processed regions 13, or a molten processed region 13 is formed continuously along the line 5 along which the object is intended to be cut, whereby a cutting start region 8 extending along the line 5 along which the object is intended to be cut is formed within the substrate 15 (S113).

Figure 20C:
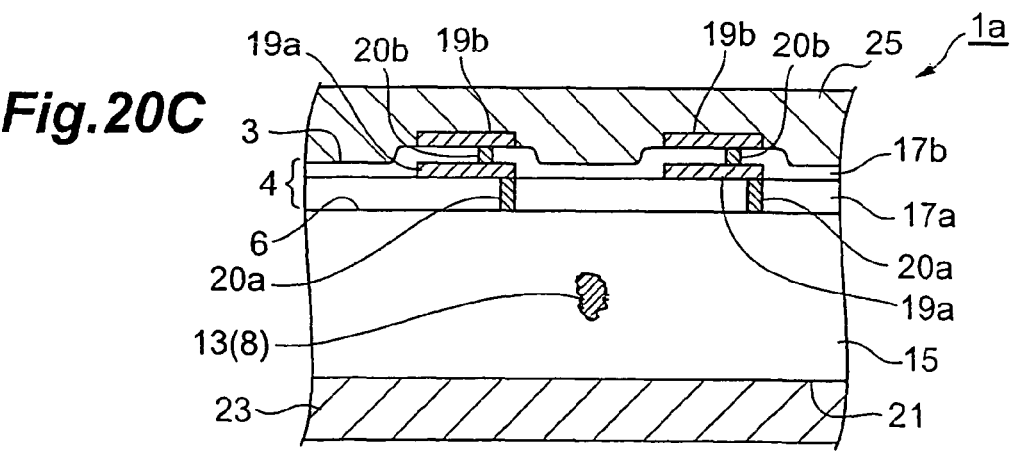

Referring to FIG. 18 again, an expandable tape 23, which is an expandable film, is attached to the rear face 21 of the wafer 1a (S5, FIG. 20C). The expandable tape 23 is made of a material which is expandable when a force is applied thereto in an expanding direction, for example, and is used for dividing the wafer 1a into chips in a later step. The expandable tape 23 is not limited to those expandable when a force is applied thereto in an expanding direction, but may be those expandable upon heating, for example.

Figure 21A:
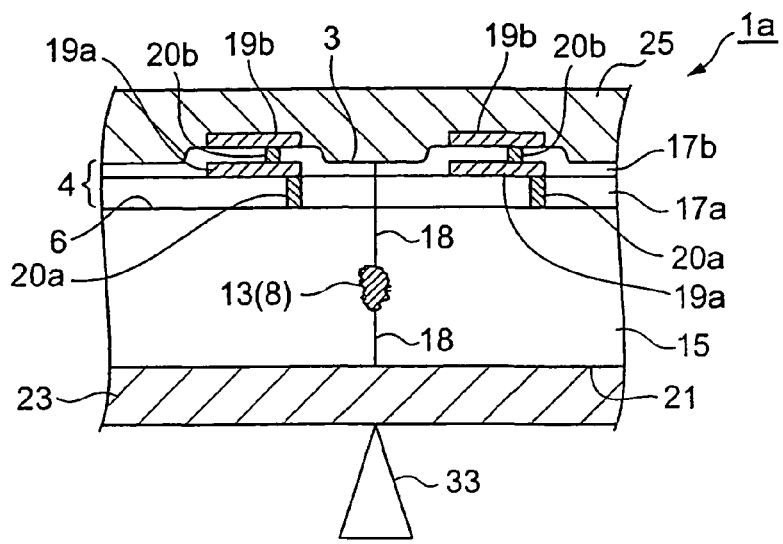
FIGS. 21A to 21C are sectional views of the wafer for explaining the laser processing method in accordance with the first example.
Figure 22:
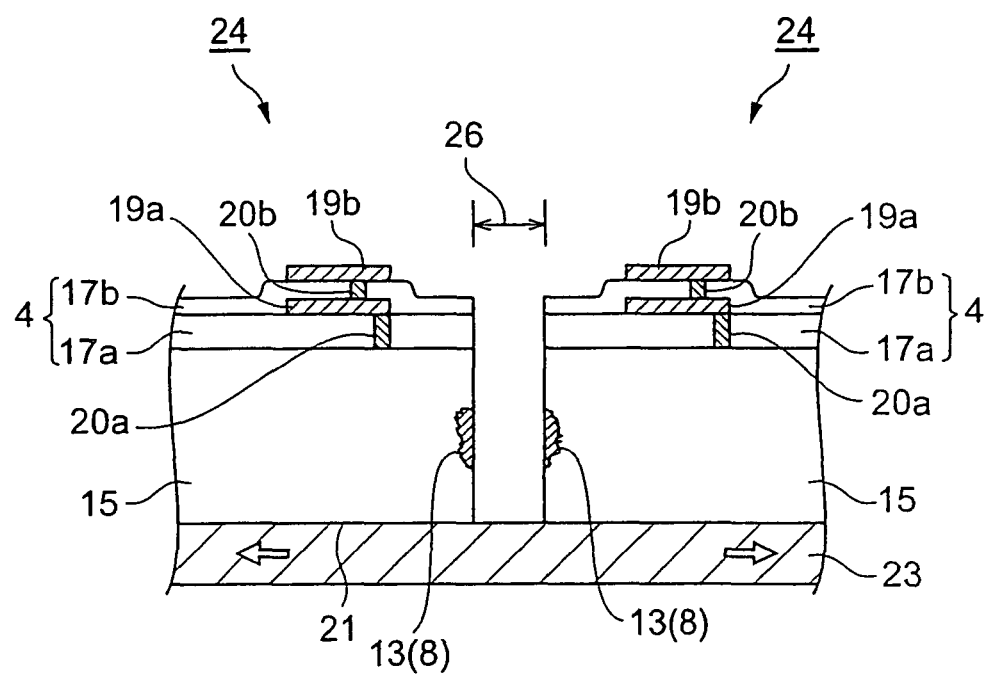
FIG. 22 is a sectional view of the wafer for explaining the laser processing method in accordance with the first example.

Next, the wafer 1a is cut into a plurality of chip parts 24 along the cutting start region 8 (S7, FIG. 21A). Namely, a knife edge 33 is pressed against the cutting start region 8 by way of the expandable tape 23 attached to the rear face 21 of the wafer 1a, so as to apply a bending stress to the wafer 1a, thereby breaking the wafer 1a from the cutting start region 8 acting as a start point. Here, fractures 18 reaching the front face 3 and rear face 21 from the cutting start region 8 occur within the wafer 1a, whereby the substrate 15 is cut together with the interlayer insulating layers 17a and 17b. Examples of means for applying a stress to the wafer 1a include not only the knife edge 33, but also breaking apparatus and roller apparatus. The front face 3 or rear face 21 of the wafer 1a may be irradiated with laser light absorbable by the wafer 1a with such an amount of energy that the surface is not molten, so as to generate such a thermal stress as to start a fracture from the cutting start region 8, thereby effecting the cutting. Also, the knife edge 33 or the like may be pressed against the protective tape 25 attached to the front face 3 of the wafer 1a, so as to apply a bending stress thereto.

Figure 21B:
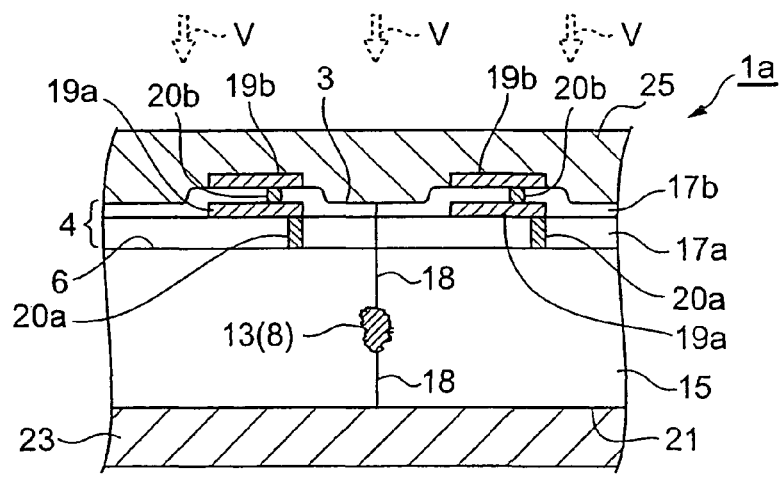

Subsequently, the protective tape 25 attached to the front face 3 of the wafer 1a is irradiated with UV rays V (S9, FIG. 21B). Irradiating the protective tape 25 with the UV rays V places the protective tape 25 in a removable state. Then, the protective tape 25 is peeled off from the front face 3 of the wafer 1a (S11, FIG. 21C). The peeling of the protective tape 25 may be performed before the step of cutting the wafer 1a (S7) as well.

Next, the wafer 1a is divided into individual chip parts 24 (S13, FIG. 22). Namely, the expandable tape 23 is expanded, so as to form a gap 26 between a plurality of chip parts 24. This makes it easier to pick up a plurality of chip parts 24 individually.

As explained in the foregoing, by attaching the protective tape 25 to the front face 3 of the wafer 1a, the laser processing method in accordance with this example can mount the wafer 1a on the mount table 107 such that the rear face 21 faces up, and thus can favorably irradiate the inside of the substrate 15 with the laser light L from the rear face 21 of the wafer 1a.

Then, a modified region formed by a phenomenon known as multiphoton absorption can form a cutting start region 8 within the substrate 15 along a desirable line 5 along which the object is intended to be cut for cutting the wafer 1a, and cut the wafer 1a from the cutting start region 8 acting as a start point. Attaching the expandable tape 23 to the rear face 21 of the wafer 1a and expanding the tape 23 can easily separate a plurality of thus cut chip parts 24 of the wafer 1a from each other.

Namely, the laser processing method in accordance with this example can form the cutting start region 8 without directly irradiating the laminating part 4 on the front face 3 of the wafer 1a with the laser light L, and thus can prevent the laminating part 4 from being damaged by the laser light L. Also, by forming the cutting start region 8 within the substrate 15, the method can cut the wafer 1a by breaking it accurately with a relatively small force from the cutting start region 8 acting as a start point, thereby easily separating the cut pieces of the wafer 1a from each other. Therefore, this laser processing method can cut the wafer 1a with a high precision even when the wafer 1a includes the laminate part 4.

Also, the laser processing method in accordance with this example can make the dicing width between the chip parts 24 much smaller than that in the conventional blade dicing method and the like. When the dicing width is made smaller as such, the gap between the individual chip parts can be reduced, so that a greater number of chip parts 24 can be taken out.

Depending on constituent materials of the laminate 4, irradiation conditions of laser light L, and the like, there may occur cases where care must be taken such that device forming regions of the laminate 4 are not irradiated with the laser light L. Since the laser light L is drastically converged so as to utilize the multiphoton absorption phenomenon in particular in this method, there are cases where it is difficult to make the laser light L incident on the front face 3 without irradiating the device forming regions of the laminate 4 with the laser light L. In general, a semiconductor layer is often laminated for a device between device forming regions of the wafer. Also, there are cases where functional devices such as TEG (Test Element Group) are formed between the device forming regions in memories, integrated circuit devices, and the like. When the laser processing method in accordance with this example is used in these cases, the laser light L is made incident on the rear face 21 not provided with the laminate part 4, whereby the cutting start region 8 can favorably be formed within the substrate 15.

The laser processing method in accordance with this example applies an external force to the wafer 1a with the knife edge 33 or the like, so as to cut the wafer 1a into a plurality of chip parts 24 from the cutting start region 8 acting as a start point. This can easily cut the wafer 1a from the cutting start region 8 acting as a start point.

The laser processing method in accordance with this example removes the protective tape 25 after attaching the expandable tape 23 to the wafer 1a. This can hold the wafer 1a formed with the cutting start region 8 without breaking it into the individual chip parts 24.

Figure 23:
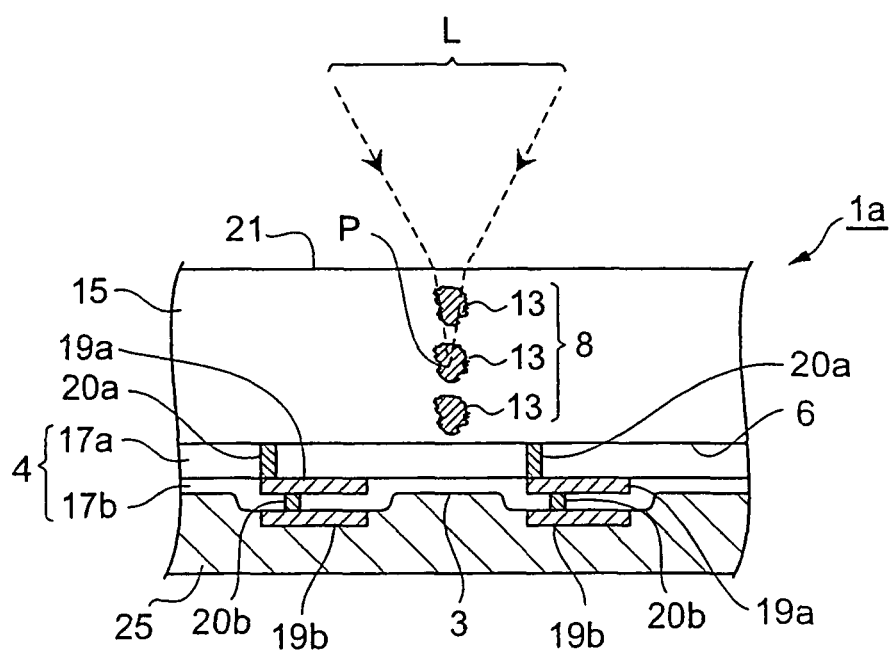
FIG. 23 is a sectional view for explaining a modified example of the laser processing method in accordance with the first example.

FIG. 23 is a sectional view for explaining a modified example of the laser processing method in accordance with this example. In this modified example, a plurality of molten processed regions 13 are formed within the substrate 15 in the thickness direction thereof. For forming the molten processed regions 13 as such, it will be preferred if the step S111 (moving the wafer along the Z axis) and step S113 (forming the modified region) in the flowchart shown in FIG. 19 are alternately carried out a plurality of times. The moving of the wafer 1a along the Z axis and the forming of the modified region may be performed at the same time, so as to form the molten processed regions 13 continuously in the thickness direction of the substrate 15.

Forming the molten processed regions 13 as in this modified example can produce the cutting start region 8 extending in the thickness direction of the substrate 15. Therefore, the wafer 1a can be cut by breaking it with a smaller force. When a fracture due to the molten processed region 13 is grown in the thickness direction of the substrate 15, the wafer 1a can be divided without the aid of external forces.

SECOND EXAMPLE

Figure 24:
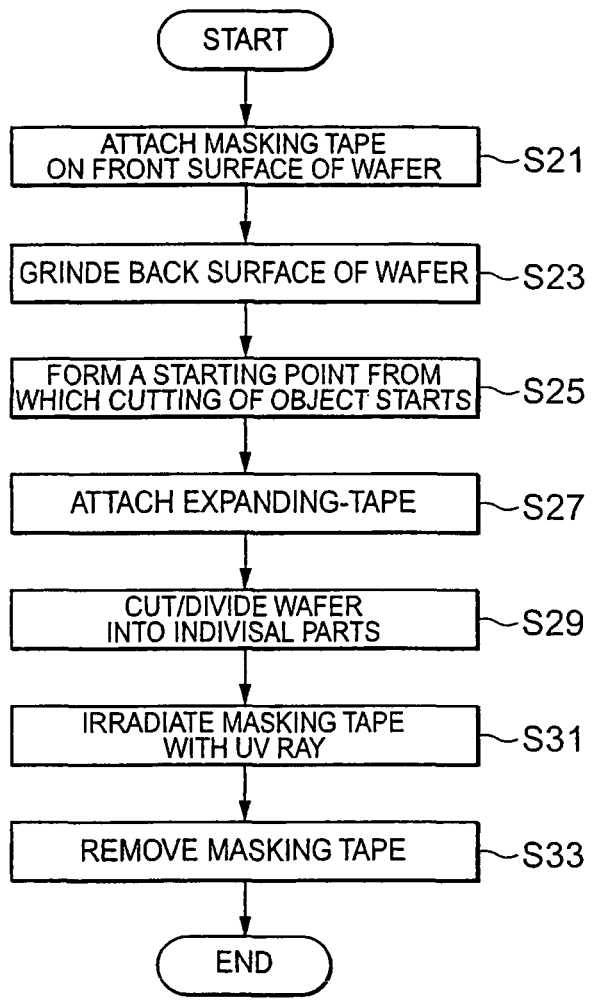
FIG. 24 is a flowchart for explaining a second example of the laser processing method in accordance with the embodiment.

FIG. 24 is a flowchart showing a second example of the laser processing method in accordance with this embodiment. FIGS. 25 to 27 are sectional views of the wafer 1a for explaining this example. This example differs from the above-mentioned first example in three points, i.e., (1) that the substrate is shaved so as to become thinner; (2) that no breaking with the knife edge 33 or the like is effected; and (3) that the protective tape 25 is peeled off after dividing the wafer 1a into a plurality of chip parts 24.

Figure 25A:
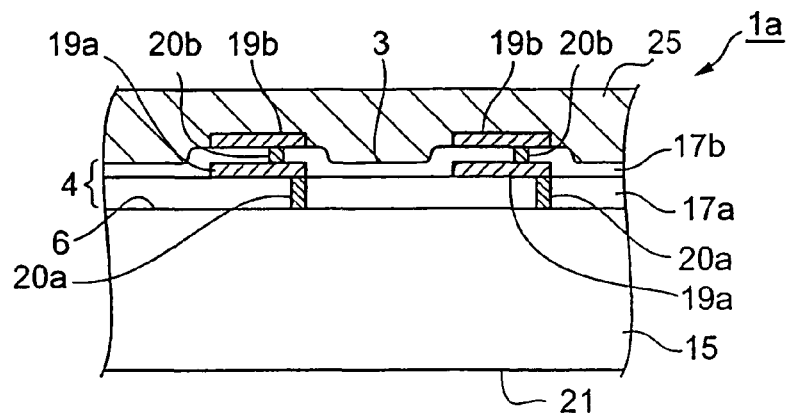
FIGS. 25A to 25C are sectional views of the wafer for explaining the laser processing method in accordance with the second example.
Figure 26A:
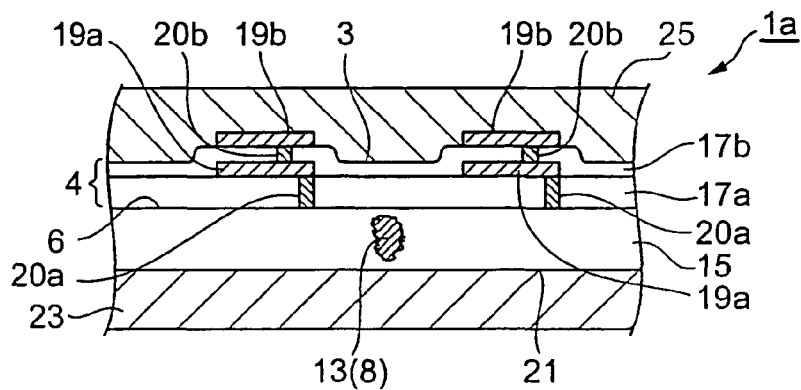
FIGS. 26A to 26C are sectional views of the wafer for explaining the laser processing method in accordance with the second example.

Referring to FIG. 24, the protective tape 25 is initially attached to the front face 3 of the wafer 1a (S21, FIG. 25A). This step is the same as the step S1 in the first example and thus will not be explained in detail.

Figure 25B:
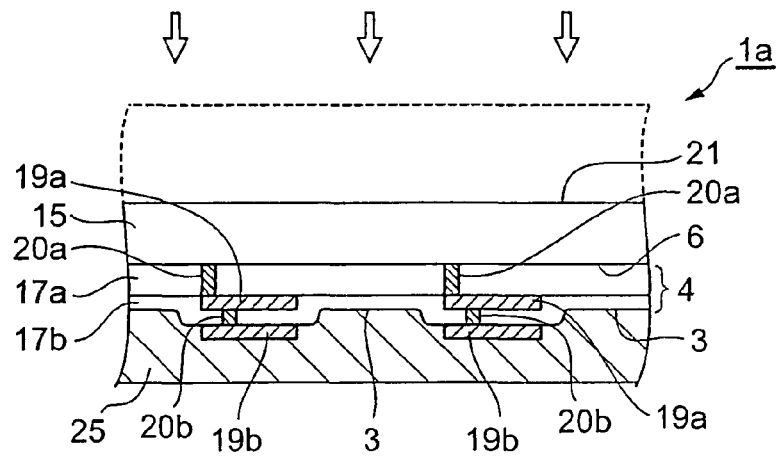

Subsequently, the rear face 21 of the wafer 1a is shaved (S23, FIG. 25B). Here, the substrate 15 is shaved (ground) until it has a thickness of 30 µm to 50 µm, for example. In order for the laser light L to be favorably made incident on the rear face 21 in the next step, it will be preferred if the rear face 21 is shaved such that the shaved rear face 21 becomes a flat and smooth surface.

Figure 25C:
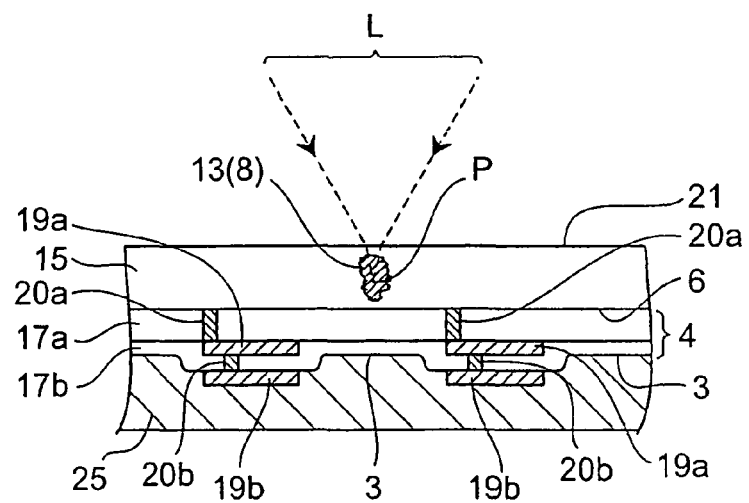

Subsequently, a cutting start region 8 is formed within the substrate 15 of the wafer 1a along the line 5 along which the object is intended to be cut (S25, FIG. 25C). Then, the expandable tape 23 is attached to the shaved rear face 21 of the wafer 1a (S27, FIG. 26A). These steps are similar to the steps S3 and S5 in the above-mentioned first example, respectively, and thus will not be explained in detail.

Figure 26B:
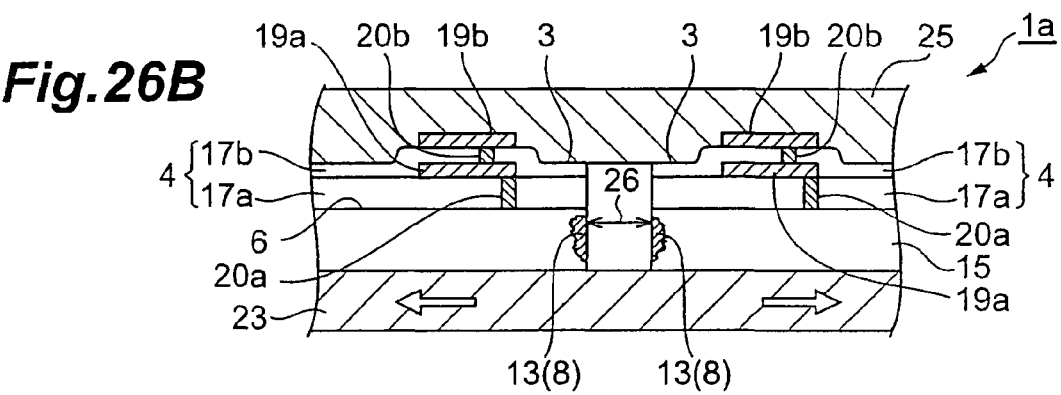
Figure 26C:
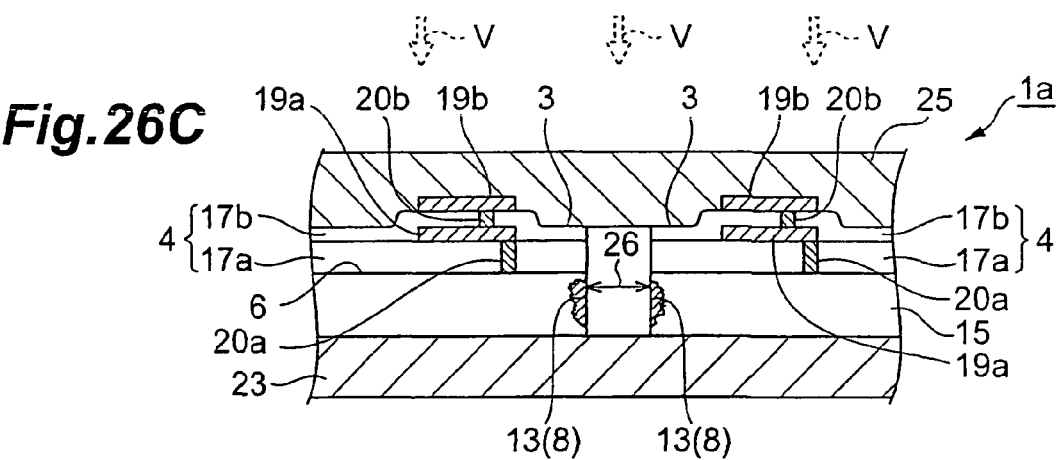
Figure 27:
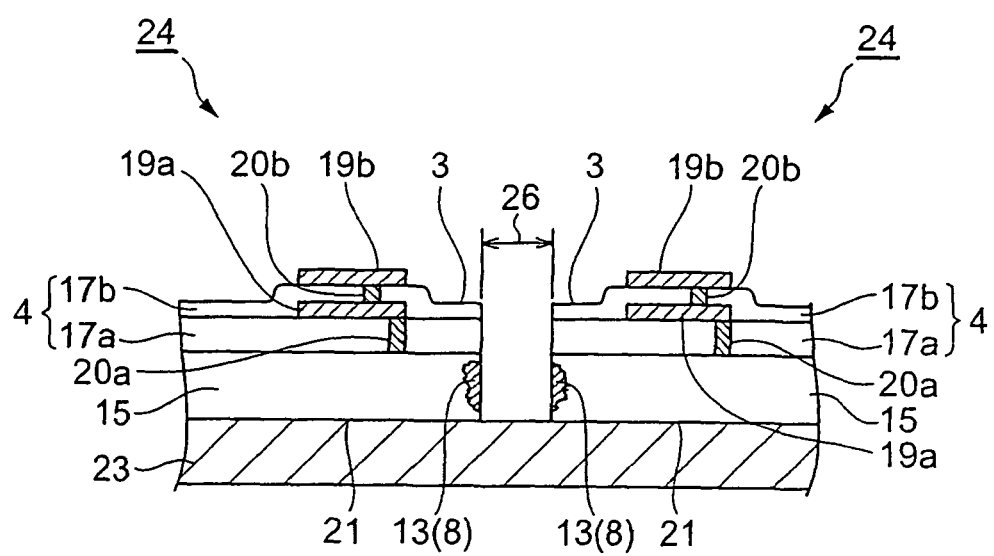
FIG. 27 is a sectional view of the wafer for explaining the laser processing method in accordance with the second example.

Next, the expandable tape 23 is expanded, so as to cut the wafer 1a into a plurality of chip parts 24 from the cutting start region 8 acting as a start point and separate the individual chip parts 24 from each other (S29, FIG. 26B). Since the substrate 15 is shaved so as to become sufficiently thin in the above-mentioned step S23, the wafer 1a is cut from the cutting start region 8 acting as a start point by a tensile stress due to the expanding of the expandable tape 23 alone. The expandable tape 23 is expanded as it is, so as to form a gap 26 between a plurality of chip parts 24.

Subsequently, the protective tape 25 is irradiated with UV rays (S31, FIG. 26C), and the protective tape 25 is peeled off from the front face 3 of the wafer 1a (S33, FIG. 27). These steps are the same as the steps S9 and S11 the above-mentioned first example, respectively, and thus will not be explained in detail. The protective tape 25 may be peeled off before the step of expanding the expandable tape 23 and cutting the wafer 1a (S29).

The laser processing method in accordance with this example can form the cutting start region 8 without directly irradiating the laminate part 4 on the front face 3 of the wafer 1a as in the above-mentioned first example, whereby the laminate part 4 can be prevented from being damaged by the laser light L. Forming the cutting start region 8 within the substrate 15 can cut the wafer 1a by accurately breaking it from the cutting start region 8 acting as a start point with a relatively small force, and easily separate thus cut pieces of the wafer 1a from each other. Therefore, this laser processing method can cut the wafer 1a with a high precision even when the wafer 1a includes the laminate part 4.

The laser processing method in accordance with this example shaves the rear face 21 of the wafer 1a such that the substrate 15 of the wafer 1a becomes thinner. This can cut the wafer 1a with a smaller force or without any special force from the cutting start region 8 acting as a start point. Also, the wafer 1a can be cut with a higher precision than in the case where the substrate 15 is relatively thick.

The laser processing method in accordance with this example expands the expandable tape 23 attached to the rear face 21 of the wafer 1a, so as to cut the wafer 1a into a plurality of chip parts 24 from the cutting start region 8 acting as a start point and separate the plurality of chip parts 24 from each other. When expanding the expandable tape 23, a tensile stress is applied to the cutting start region 8 of the wafer 1a, whereby the wafer 1a can favorably be cut from the cutting start region 8 acting as a start point. Hence, this embodiment can concurrently carry out the step of cutting the wafer 1a and the step of separating a plurality of chip parts 24 from each other, and thus can reduce the number of manufacturing steps.

The laser processing method in accordance with this example emits the laser light L while employing the rear face 21 of the wafer 1a as the laser light entrance surface. According to an experiment conducted by the inventors, modified regions such as the molten processed region 13 tend to be formed with a bias toward the laser light entrance surface side within the substrate 15. Therefore, in this laser processing method, the cutting start region 13 is likely to be formed with a bias toward the rear face 21 to which the expandable tape 23 is attached. On the other hand, expanding the expandable tape 23 applies a greater tensile stress to the vicinity of the rear face 21 of the substrate 15 than the vicinity of the front face 3 thereof. Therefore, when the cutting start region 8 is biased toward the rear face 21 within the substrate 15, the tensile stress due to the expanding of the expandable tape 25 can be exerted on the cutting start region 8 more effectively. As a consequence of the foregoing, the laser processing method in accordance with this example can exert the tensile stress on the cutting start region 8 more effectively, whereby the wafer 1a can be cut with a smaller force.

After separating a plurality of chip parts 24 of the wafer 1a from each other by expanding the expandable tape 23, the laser processing method in accordance with this example removes the protective tape 25. Tills can protect the plurality of chip parts 24 until they are taken out after cutting the wafer 1a.

THIRD EXAMPLE

Figure 28:
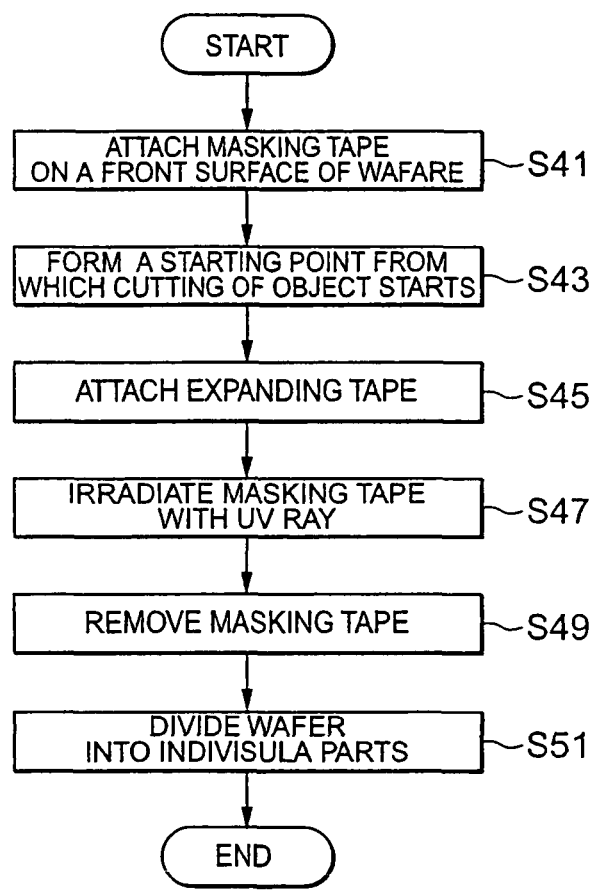
FIG. 28 is a flowchart for explaining a third example of the laser processing method in accordance with the embodiment.

FIG. 28 is a flowchart showing a third example of the laser processing method in accordance with this embodiment. This example differs from the above-mentioned first example in one point, i.e., (1) that the breaking with the knife edge 33 or the like is not effected. This modified example will be explained with reference to FIGS. 20 to 22 which are shown in the first example.

Referring to FIG. 28, the protective tape 25 is initially attached to the front face 3 of the wafer 1a (S41, FIG. 20A). Subsequently, the cutting start region 8 is formed within the substrate 15 of the wafer 1a along the line 5 along which the object is intended to be cut (S43, FIG. 20B). Then, the expandable tape 23 is attached to the rear face 21 of the wafer 1a (S45, FIG. 20C). These steps are the same as the steps S1 to S5 in the above-mentioned first example, respectively, and thus will not be explained in detail.

Figure 21C:
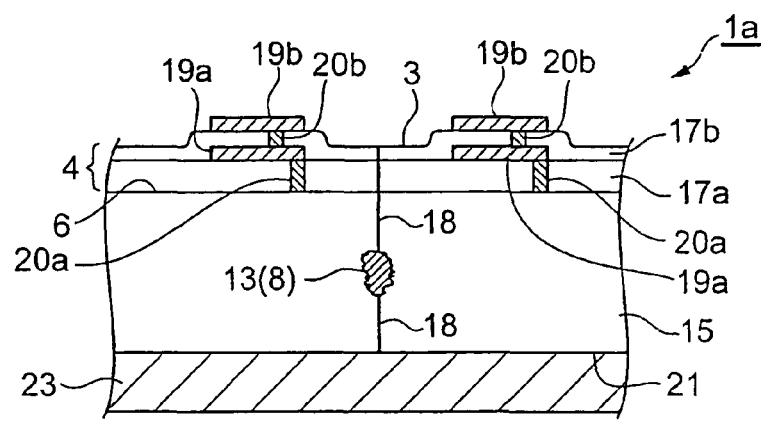

Next, the protective tape 25 is irradiated with UV rays (S47, FIG. 21B), and is peeled off from the front face 3 of the wafer 1a (S49, FIG. 21C). These steps are the same as the steps S9 and S11 in the above-mentioned first example, respectively, and thus will not be explained in detail. Since no stress is exerted by the knife edge 33, however, the fractures 18 shown in FIGS. 21B and 21C do not occur in this modified example.

Subsequently, the expandable tape 23 is expanded, so as to cut the wafer 1a into a plurality of chip parts 24 from the cutting start region 8 acting as a start point and separate the individual chip parts 24 from each other (S51, FIG. 22). Since the substrate 15 is not shaved thin as in the above-mentioned second example, the tensile stress due to the expanding of the expandable tape 23 is made greater than that in the second example, whereby the wafer 1a is cut while the cutting start region 8 acts as a start point. Then, the expandable tape 23 is expanded as it is, so as to form a gap 26 between a plurality of chip parts 24.

The laser processing method in accordance with this example can cut the wafer 1a with a high precision even when the wafer 1a includes the laminate part 4, because of the same reason as that of the above-mentioned first example.

The laser processing method in accordance with this example expands the expandable tape 23, so as to cut the wafer 1a into a plurality of chip parts 24 from the cutting start region 8 acting as a start point and separate the plurality of chip parts 24 from each other as with the above-mentioned second example. This can concurrently carry out the step of cutting the wafer 1a and the step of separating a plurality of chip parts 24 from each other, and thus can reduce the number of manufacturing steps.

FOURTH EXAMPLE

Figure 29:
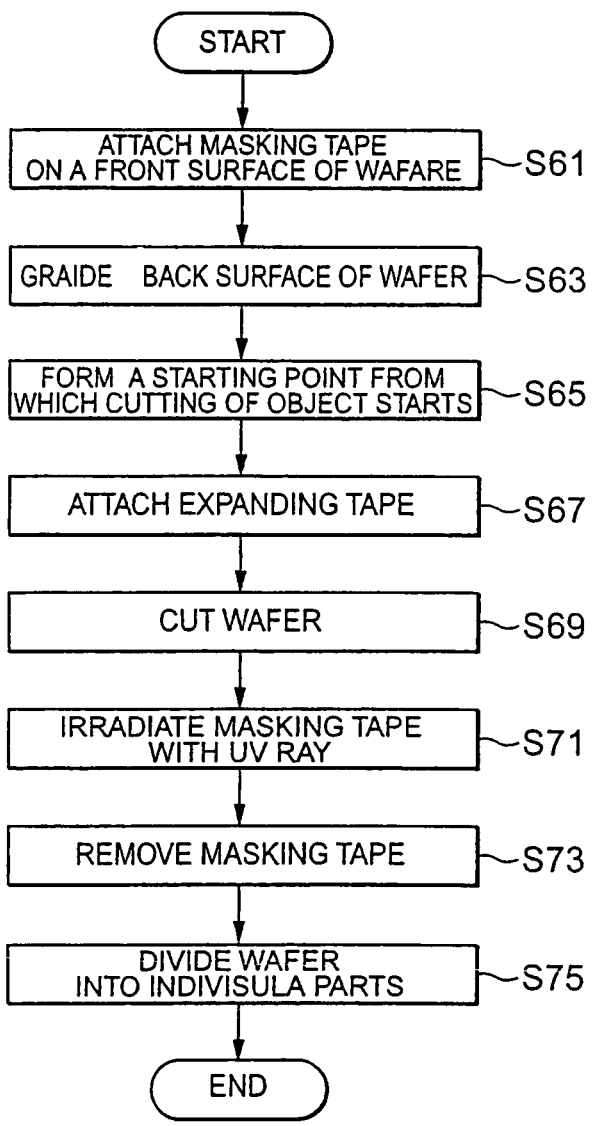
FIG. 29 is a flowchart for explaining a fourth example of the laser processing method in accordance with the embodiment.

FIG. 29 is a flowchart showing a fourth example of the laser processing method in accordance with this embodiment. This example differs from the above-mentioned first example in one point, i.e., (1) that the substrate 15 is shaved so as to become thinner. This modified example will be explained with reference to FIGS. 20 to 22 shown in the first example and FIG. 25 shown in the second example.

Referring to FIG. 29, the protective tape 25 is initially attached to the front face 3 of the wafer 1a (S61, FIG. 20A). This step is the same as the step S1 in the first example, and thus will not be explained in detail. Subsequently, the rear face 21 of the wafer 1a is shaved (S63, FIG. 25B). This step is the same as the step S23 in the second example, and thus will not be explained in detail. Then, the cutting start region 8 is formed within the substrate 15 of the wafer 1a along the line 5 along which the object is intended to be cut (S65, FIG. 25C). This step is the same as the step S3 in the first example, and thus will not be explained in detail.

Next, the expandable tape 23 is attached to the rear face 21 of the wafer 1a (S67, FIG. 20C); an external force is applied to the wafer 1a, so as to cut the wafer 1a into a plurality of chip parts 24 along the cutting start region 8 (S69, FIG. 21A); the protective tape 25 is irradiated with UV rays (S71, FIG. 21B); the protective tape 25 is peeled off from the front face 3 of the wafer 1a (S73, FIG. 21C); and the expandable tape 23 is expanded, so as to separate the individual chip parts 24 of the wafer 1a from each other (S75, FIG. 22). These steps are the same as the steps S5 to S13 in the above-mentioned first example, and thus will not be explained in detail. Since the rear face 21 of the wafer 1a is shaved at step S63, however, the substrate 15 in this example is thinner than the substrate 15 shown in FIGS. 20C, 21A to 21C, and 22. The protective tape 25 may be peeled off before the step of cutting the wafer 1a (S69).

The laser processing method in accordance with this example can cut the wafer 1a with a high precision even when the wafer 1a includes the laminate part 4, because of the same reason as that of the above-mentioned first example.

The laser processing method in accordance with this example shaves the rear face 21 of the wafer 1a such that the substrate 15 of the wafer 1a becomes thinner as in the second example. This can cut the wafer 1a with a smaller force or without any special force from the cutting start region 8 acting as a start point.

The laser processing method in accordance with this example cuts the wafer 1a into a plurality of chip parts 24 from the cutting start region 8 acting as a start point by applying an external force to the wafer 1a as in the first example. This can easily cut the wafer 1a from the cutting start region 8 acting as a start point.

Though the embodiment and examples of the present invention are explained in detail in the foregoing, the present invention is not limited to the above-mentioned embodiment and examples as a matter of course.

For example, though the above-mentioned embodiment and examples use a semiconductor substrate as a substrate, the present invention is not limited thereto but is favorably applicable to wafers having conductive substrates and insulative substrates.

INDUSTRIAL APPLICABILITY

As explained in the foregoing, by attaching a protective film to the front face of an object to be processed, the laser processing method in accordance with the present invention can mount the object onto a table such that the rear face faces up, whereby the inside of the substrate can favorably be irradiated with laser light from the rear face of the object. A modified region formed by a phenomenon known as multiphoton absorption can form a cutting start region within the substrate, whereas the object can be cut from the cutting start region acting as a start point. Attaching an expandable film to the rear face of the object and expanding the film can easily separate a plurality of cut parts of the object from each other. Namely, this laser processing method can form a cutting start region without directly irradiating the laminate part on the front face of the object with laser light, and can cut the substrate by accurately breaking it with a relatively small force from the cutting start region acting as a start point, whereby thus cut pieces of the object can easily be separated from each other. Hence, this laser processing method can cut an object to be processed with a high precision, even when the object has various laminate structures.

The invention claimed is:

1. A laser processing method for cutting a flat object to be processed including a substrate and a laminate part disposed on the substrate, the method comprising the steps of:

attaching a protective film to a front face of the object on the laminate part side;

irradiating a portion of a rear face of the object with laser light, after the step of attaching the protective film, wherein the portion of the rear face of the object comprises a laser light entrance surface, and converging the laser light at a light-converging point within the substrate to form a modified region along a cutting line, wherein the modified region is a cutting start region located in the object by a predetermined distance from the rear face such that a fracture is naturally grown in a thickness direction of the object after the forming of the cutting start region in the substrate, and the fracture reaches both the front face and the rear face of the object thereby dividing the object into a plurality of parts without separating adjacent parts of the plurality of parts from each other;

attaching an expandable film to the rear face of the object, after the step of irradiating the object; and separating the adjacent parts of the plurality of parts from each other by expanding the expandable film so that a gap exists between the adjacent parts of the plurality of parts, after the step of attaching the expandable film.

2. A laser processing method according to claim 1, wherein the rear face of the object is shaved so as to thin the substrate of the object before forming the cutting start region in the object.

3. A laser processing method according to claim 1, wherein the protective film is removed after the expandable film is attached to the object.

4. A laser processing method according to claim 1, wherein the protective film is removed after a plurality of parts of the object are separated from each other by expanding the expandable film.

5. A laser processing method according to claim 1, wherein in the step of attaching the protective film, an entire front surface of the flat object is covered by the protective film, the protective film forming a peelable tape.

6. A laser processing method for cutting a flat object to be processed including a substrate and a laminate part disposed on the substrate, the method comprising the steps of:

attaching a protective film to a front face of the object on the laminate part side;

irradiating a portion of a rear face of the object with laser light, after the step of attaching the protective film, wherein the portion of the rear face of the object comprises a laser light entrance surface, and converging the laser light at a light-converging point within the substrate to form a modified region along a cutting line, wherein the modified region is a cutting start region located in the object by a predetermined distance from the rear face;

attaching an expandable film to the rear face of the object, after the step of irradiating the object;

applying a force to the object so as to form cracks originating from the cutting start region and extending to the front face and the rear face of the object, which divide the object into a plurality of parts without separating adjacent parts of the plurality of parts from each other; and separating the adjacent parts of the plurality of parts from each other by expanding the expandable film so that a gap exists between the adjacent parts of the plurality of parts, after the step of attaching the expandable film.

7. A laser processing method according to claim 6, wherein the rear face of the object is shaved so as to thin the substrate of the object before forming the cutting start region in the object.

8. A laser processing method according to claim 6, wherein the protective film is removed after the expandable film is attached to the object.

9. A laser processing method according to claim 6, wherein the protective film is removed after a plurality of parts of the object are separated from each other by expanding the expandable film.

10. A laser processing method according to claim 6, wherein in the step of attaching the protective film, an entire front surface of the flat object is covered by the protective film, the protective film forming a peelable tape.

11. A laser processing method for cutting a flat object to be processed including a substrate and a laminate part disposed on the substrate, the method comprising the steps of:

attaching a protective film to a front face of the object on the laminate part side;

irradiating a portion of a rear face of the object with laser light, after the step of attaching the protective film, wherein the portion of the rear face of the object comprises a laser light entrance surface, and converging the laser light at a light-converging point within the substrate to form a modified region along a cutting line, wherein the modified region is a cutting start region located in the object by a predetermined distance from the rear face;

attaching an expandable film to the rear face of the object after said step of irradiating; and cutting the substrate and the laminate part after the step of attaching the expandable film, thereby cutting the object into a plurality of parts from the cutting start region, and separating adjacent parts of the plurality of parts of the object from each other so that a gap exists between the adjacent parts of the plurality of parts, wherein the cutting and the separating result from expanding the expandable film.

12. A laser processing method according to claim 11, wherein the rear face of the object is shaved so as to thin the substrate of the object before forming the cutting start region in the object.

13. A laser processing method according to claim 11, wherein the protective film is removed after the expandable film is attached to the object.

14. A laser processing method according to claim 11, wherein the protective film is removed after a plurality of parts of the object are separated from each other by expanding the expandable film.

15. A laser processing method according to claim 11, wherein in the step of attaching the protective film, an entire front surface of the flat object is covered by the protective film, the protective film forming a peelable tape.

16. A laser processing method for cutting a flat object to be processed including a semiconductor substrate and a laminate part disposed on the semiconductor substrate, the method comprising the steps of:

attaching a protective film to a front face of the object on the laminate part side;

irradiating a portion of a rear face of the object with laser light, after the step of attaching the protective film, wherein the portion of the rear face of the object comprises a laser light entrance surface, and converging the laser light at a light-converging point within the semiconductor substrate to form a molten processed region, along a cutting line, wherein the molten processed region is a cutting start region located in the object by a predetermined distance from the rear surface such that a fracture is naturally grown in a thickness direction of the object after the forming of the cutting start region in the substrate, and the fracture reaches both the front face and the rear face of the object thereby dividing the object into a plurality of parts without separating adjacent parts of the plurality of parts from each other;

attaching an expandable film to the rear face of the object, after the step of irradiating the object; and separating the adjacent parts of the plurality of parts from each other by expanding the expandable film so that a gap exists between the adjacent parts of the plurality of parts, after the step of attaching the expandable film.

17. A laser processing method according to claim 16, wherein the rear face of the object is shaved so as to thin the substrate of the object before forming the cutting start region in the object.

18. A laser processing method according to claim 16, wherein the protective film is removed after the expandable film is attached to the object.

19. A laser processing method according to claim 16, wherein the protective film is removed after a plurality of parts of the object are separated from each other by expanding the expandable film.

20. A laser processing method according to claim 16, wherein in the step of attaching the protective film, an entire front surface of the flat object is covered by the protective film, the protective film forming a peelable tape.

21. A laser processing method for cutting a flat object to be processed including a semiconductor substrate and a laminate part disposed on the semiconductor substrate, the method comprising the steps of attaching a protective film to a front face of the object on the laminate part side;

irradiating a portion of a rear face of the object with laser light, after the step of attaching the protective film, wherein the portion of the rear face of the object comprises a laser light entrance surface, and converging the laser light at a light-converging point within the semiconductor substrate to form a molten processed region along a cutting line, wherein the molten processed region is a cutting start region located in the object by a predetermined distance from the rear face;

attaching an expandable film to the rear face of the object, after the step of irradiating the object;

applying a force to the object so as to form cracks originating from the cutting start region and extending to the front face and the rear face of the object, which divide the object into a plurality of parts without separating adjacent parts of the plurality of parts from each other; and separating the adjacent parts of the plurality of parts from each other by expanding the expandable film so that a gap exists between the adjacent parts of the plurality of parts, after the step of attaching the expandable film.

22. A laser processing method according to claim 21, wherein the rear face of the object is shaved so as to thin the substrate of the object before forming the cutting start region in the object.

23. A laser processing method according to claim 21, wherein the protective film is removed after the expandable film is attached to the object.

24. A laser processing method according to claim 21, wherein the protective film is removed after a plurality of parts of the object are separated from each other by expanding the expandable film.

25. A laser processing method according to claim 21, wherein in the step of attaching the protective film, an entire front surface of the flat object is covered by the protective film, the protective film forming a peelable tape.

26. A laser processing method for cutting a flat object to be processed including a semiconductor substrate and a laminate part disposed on the semiconductor substrate, the method comprising the steps of;

attaching a protective film to a front face of the object on the laminate part side;

irradiating a portion of a rear face of the object with laser light, after the step of attaching the protective film, wherein the portion of the rear face of the object comprises a laser light entrance surface, and converging the laser light at a light-converging point within the semiconductor substrate to form a molten processed region along a cutting line, wherein the molten processed region is a cutting start region located in the object by a predetermined distance from the rear face;

attaching an expandable film to the rear face of the object after said step of irradiating; and cutting the semiconductor substrate and the laminate part after the step of attaching the expandable film, thereby cutting the object into a plurality of parts from the cutting start region, and separating adjacent parts of the plurality of parts of the object from each other so that a gap exists between the adjacent parts of the plurality of parts, wherein the cutting and the separating result from expanding the expandable film.

27. A laser processing method according to claim 26, wherein the rear face of the object is shaved so as to thin the substrate of the object before forming the cutting start region in the object.

28. A laser processing method according to claim 26, wherein the protective film is removed after the expandable film is attached to the object.

29. A laser processing method according to claim 26, wherein the protective film is removed after a plurality of parts of the object are separated from each other by expanding the expandable film.

30. A laser processing method according to claim 26, wherein in the step of attaching the protective film, an entire front surface of the flat object is covered by the protective film, the protective film forming a peelable tape.

31. A method of manufacturing a semiconductor device formed using a laser processing method for cutting a flat object to be processed including a substrate and a laminate part disposed on the substrate, the manufacturing method comprising:

attaching a protective film to a front face of the object on the laminate part side;

irradiating a portion of a rear face of the object, after the step of attaching the protective film, the object comprising semiconductor material and having a surface formed with at least one semiconductor device, with laser light, wherein the portion of the rear face of the object comprises a laser light entrance surface, and converging the laser light at a light-converging point within the substrate to form a modified region along a cutting line, wherein the modified region is a cutting start region located in the object by a predetermined distance from the rear face such that a fracture is naturally grown in a thickness direction of the object after the forming of the cutting start region in the substrate, and the fracture reaches both the front face and the rear face of the object thereby dividing the object into a plurality of parts without separating adjacent parts of the plurality of parts from each other;

attaching an expandable film to the rear face of the object, after the step of irradiating the object; and separating the adjacent parts of the plurality of parts from each other by expanding the expandable film so that a gap exists between the adjacent parts of the plurality of parts, with such expanding thereby providing at least one manufactured semiconductor device on a cut portion of the object that is separate from any other cut portion of the object, after the step of attaching the expandable film.

32. A laser processing method according to claim 31, wherein in the step of attaching the protective film, an entire front surface of the flat object is covered by the protective film, the protective film forming a peelable tape.

33. A method of manufacturing a semiconductor device formed using a laser processing method for cutting a flat object to be processed including a substrate and a laminate part disposed on the substrate, the manufacturing method comprising:

attaching a protective film to a front face of the object on the laminate part side;

irradiating a portion of a rear face of the object, after the step of attaching the protective film, the object comprising semiconductor material and having a surface formed with at least one semiconductor device, with laser light, wherein the portion of the rear face of the object comprises a laser light entrance surface, and converging the laser light at a light-converging point within the substrate to form a modified region along a cutting line, wherein the modified region is a cutting start region located in the object by a predetermined distance from the rear face;

attaching an expandable film to the rear face of the object, after the step of irradiating the object;

applying a force to the object so as to form cracks originating from the cutting start region and extending to the front face and the rear face of the object, which divide the object into a plurality of parts without separating adjacent parts of the plurality of parts from each other; and separating the adjacent parts of the plurality of parts from each other by expanding the expandable film so that a gap exists between the adjacent parts of the plurality of parts, with such expanding thereby providing at least one manufactured semiconductor device on a cut portion of the object that is separate from any other cut portion of the object, after the step of attaching the expandable film.

34. A laser processing method according to claim 33, wherein in the step of attaching the protective film, an entire front surface of the flat object is covered by the protective film, the protective film forming a peelable tape.

35. A method of manufacturing a semiconductor device formed using a laser processing method for cutting a flat object to be processed including a substrate and a laminate part disposed on the substrate, the manufacturing method comprising:

attaching a protective film to a front face of the object on the laminate part side;

irradiating a portion of a rear face of the object, after the step of attaching the protective film, the object comprising semiconductor material and having a surface formed with at least one semiconductor device, with laser light, wherein the portion of the rear face of the object comprises a laser light entrance surface, and converging the laser light at a light-converging point within the substrate to form a modified region along a cutting line, wherein the modified region is a cutting start region located in the object by a predetermined distance from the rear face;

attaching an expandable film to the rear face of the object after said step of irradiating; and cutting the substrate and the laminate part after the step of attaching the expandable film, thereby cutting the object into a plurality of parts from the cutting start region, and separating adjacent parts of the plurality of parts of the object from each other so that a gap exists between the adjacent parts of the plurality of parts, wherein the cutting and the separating result from expanding the expandable film, with such expanding thereby providing at least one manufactured semiconductor device on a cut portion of the object that is separate from the other cut portions of the object.

36. A laser processing method according to claim 35, wherein in the step of attaching the protective film, an entire front surface of the flat object is covered by the protective film, the protective film forming a peelable tape.

37. A method of manufacturing a semiconductor device formed using a laser processing method for cutting a flat object to be processed including a semiconductor substrate and a laminate part disposed on the semiconductor substrate, the manufacturing method comprising:

attaching a protective film to a front face of the object on the laminate part side;

irradiating a portion of a rear face of the object, after the step of attaching the protective film, the object having a surface formed with at least one semiconductor device, with laser light, wherein the portion of the rear face of the object comprises a laser light entrance surface, and converging the laser light at a light-converging point within the semiconductor substrate to form a molten processed region along a cutting line, wherein the molten processed region is a cutting start region located in the object by a predetermined distance from the rear face such that a fracture is naturally grown in a thickness direction of the object after the forming of the cutting start region in the substrate, and the fracture reaches both the front face and the rear face of the object thereby dividing the object into a plurality of parts without separating adjacent parts of the plurality of parts from each other;

attaching an expandable film to the rear face of the object, after the step of irradiating the object; and separating the adjacent parts of the plurality of parts from each other by expanding the expandable film so that a gap exists between the adjacent parts of the plurality of parts, with such expanding thereby providing at least one manufactured semiconductor device on a cut portion of the object that is separate from any other cut portion of the object, after the step of attaching the expandable film.

38. A laser processing method according to claim 37, wherein in the step of attaching the protective film, an entire front surface of the flat object is covered by the protective film, the protective film forming a peelable tape.

39. A method of manufacturing a semiconductor device formed using a laser processing method for cutting a flat object to be processed including a semiconductor substrate and a laminate part disposed on the semiconductor substrate, the manufacturing method comprising:

attaching a protective film to a front face of the object on the laminate part side;

irradiating a portion of a rear face of the object, after the step of attaching the protective film, the object having a surface formed with at least one semiconductor device, with laser light, wherein the portion of the rear face of the object comprises a laser light entrance surface, and converging the laser light at a light-converging point within the semiconductor substrate to form a molten processed region along a cutting line, wherein the molten processed region is a cutting start region located in the object by a predetermined distance from the rear face;

attaching an expandable film to the rear face of the object, after the step of irradiating the object;

applying a force to the object so as to form cracks originating from the cutting start region and extending to the front face and the rear face of the object, which divide the object into a plurality of parts without separating adjacent parts of the plurality of parts from each other; and separating the adjacent parts of the plurality of parts from each other by expanding the expandable film so that a gap exists between the adjacent parts of the plurality of parts, with such expanding thereby providing at least one manufactured semiconductor device on a cut portion of the object that is separate from any other cut portion of the object, after the step of attaching the expandable film.

40. A laser processing method according to claim 39, wherein in the step of attaching the protective film, an entire front surface of the flat object is covered by the protective film, the protective film forming a peelable tape.

41. A method of manufacturing a semiconductor device formed using a laser processing method for cutting a flat object to be processed including a semiconductor substrate and a laminate part disposed on the semiconductor substrate, the manufacturing method comprising:

attaching a protective film to a front face of the object on the laminate part side;

irradiating a portion of a rear face of the object, after the step of attaching the protective film, the object having a surface formed with at least one semiconductor device, with laser light, wherein the portion of the rear face of the object comprises a laser light entrance surface, and converging the laser light at a light-converging point within the semiconductor substrate to form a molten processed region along a cutting line, wherein the molten processed region is a cutting start region located in the object by a predetermined distance from the rear face;

attaching an expandable film to the rear face of the object after said step of irradiating; and cutting the semiconductor substrate and the laminate part after the step of attaching the expandable film, thereby cutting the object into a plurality of parts from the cutting start region, and separating adjacent parts of the plurality of parts of the object from each other so that a gap exists between the adjacent parts of the plurality of parts, wherein the cutting and the separating result from expanding the expandable film, with such expanding thereby providing at least one manufactured semiconductor device on a cut portion of the object that is separate from the other cut portions of the object.

42. A laser processing method according to claim 41, wherein in the step of attaching the protective film, an entire front surface of the flat object is covered by the protective film, the protective film forming a peelable tape.

\* \* \* \* \*